United States Patent
Ueda et al.

(10) Patent No.: US 10,216,151 B2
(45) Date of Patent: Feb. 26, 2019

(54) POWER CONSUMPTION-AMOUNT ESTIMATION APPARATUS

(71) Applicant: Mitsubishi Electric Corporation, Tokyo (JP)

(72) Inventors: Koichiro Ueda, Tokyo (JP); Takemasa Arakawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 83 days.

(21) Appl. No.: 15/526,440

(22) PCT Filed: Jun. 23, 2015

(86) PCT No.: PCT/JP2015/068072
§ 371 (c)(1),
(2) Date: May 12, 2017

(87) PCT Pub. No.: WO2016/207980
PCT Pub. Date: Dec. 29, 2016

(65) Prior Publication Data
US 2018/0299838 A1    Oct. 18, 2018

(51) Int. Cl.
*G05B 11/28*    (2006.01)
*G05B 6/02*    (2006.01)

(52) U.S. Cl.
CPC ..................... *G05B 6/02* (2013.01)

(58) Field of Classification Search
CPC .. H02P 23/00; H02P 3/00; H02P 21/22; H02P 27/08; H02P 21/0003; G05B 11/18;
(Continued)

(56) References Cited

U.S. PATENT DOCUMENTS 4,008,423 A * 2/1977 Christianson ............ B60L 3/00
    318/139
5,892,347 A * 4/1999 Zweighaft .............. G05B 11/28
    318/400.12
(Continued)

FOREIGN PATENT DOCUMENTS

JP    2004-010236 A    1/2004
JP    2011-005623 A    1/2011
(Continued)

OTHER PUBLICATIONS

International Search Report of PCT/JP2015/068072 dated Sep. 15, 2015.

*Primary Examiner* — Rina Duda
(74) *Attorney, Agent, or Firm* — Sughrue Mion, PLLC; Richard C. Turner

(57) ABSTRACT

A power-consumption-amount estimation apparatus estimating a power consumption amount of an industrial machine including a motor, a machine driven by the motor, and an amplifier driving the motor, includes: an operation-pattern-information obtaining unit; a dynamics-information obtaining unit; a circuit-information obtaining unit obtaining amplifier information and motor information; and a power-consumption-amount calculation unit executing a process of calculating power of each of the motor and the regenerative resistor based on operation-pattern information, dynamics information, amplifier information, motor information, and a bus voltage simulated value and calculating power of the industrial machine based on the calculated power and execute a process of updating the bus voltage based on the calculated power of each of the motor and the regenerative resistor and the calculated power of the industrial machine, over a specified period, and calculating a power consump-
(Continued)

tion amount of the industrial machine by integrating the calculated power of the industrial machine.

18 Claims, 15 Drawing Sheets

(58) Field of Classification Search
CPC ........ G05B 11/01; G05B 15/32; G05B 11/28; G05B 15/26
See application file for complete search history.

(56) References Cited

U.S. PATENT DOCUMENTS

| | | |
|---|---|---|
| 7,084,595 B2 | 8/2006 | Brogardh et al. |
| 7,821,219 B2 * | 10/2010 | Ishii ........................ H02P 21/22 318/491 |
| 8,120,294 B2 * | 2/2012 | Ibori ..................... H02M 5/458 318/375 |
| 2010/0305751 A1 | 12/2010 | Nagatsuka et al. |
| 2014/0306634 A1 * | 10/2014 | Sakai ................... H02P 27/085 318/490 |
| 2016/0020721 A1 | 1/2016 | Ueda |
| 2016/0084494 A1 * | 3/2016 | Sonnervig ............... H02J 15/00 392/307 |

FOREIGN PATENT DOCUMENTS

| | | |
|---|---|---|
| JP | 2012-222890 A | 11/2012 |
| JP | 2014-219911 A | 11/2014 |
| WO | 2012/169278 A1 | 12/2012 |
| WO | 2014/185123 A1 | 11/2014 |

\* cited by examiner

POWER CONSUMPTION-AMOUNT ESTIMATION APPARATUS

CROSS REFERENCE TO RELATED APPLICATIONS

This application is a National Stage of International Application No. PCT/JP2015/068072 filed Jun. 23, 2015, the contents of which are incorporated herein by reference in its entirety.

The present invention relates to a power-consumption-amount estimation apparatus that estimates the power consumption amount without having the industrial machine operate.

BACKGROUND

As a driving source of various types of industrial machines, an electric motor such as a servo motor is used. The expense of electricity consumed by a motor and an amplifier, which drives the motor, often constitutes the majority of the running costs of an industrial machine.

The electricity expense is incurred basically according to the power consumption amount, i.e., integral power. As the power consumption amount becomes smaller, the electricity expense becomes lower. In the case of checking a power consumption amount needed for operating a machine, it is conceivable to manufacture an actual machine, install a power meter in the machine in addition to mounting a motor, an amplifier, and other devices thereto, and then measure the actual power consumed to operate the machine by using the power meter. However, manufacturing the actual machine incurs costs, and it requires time and effort. Further time and effort is required to install the power meter in the machine and to measure the power. Furthermore, each time there is a change in the machine configuration such as changing the mechanical parts, the measurement needs to be performed again in order to accurately calculate the power consumption amount. This requires more time and effort. In order to solve the problem with the requirements of time and effort as described above, the invention to estimate power by simulation has been disclosed in Patent Literature 1.

The invention described in Patent Literature 1 calculates, on the basis of the operation program, the workload of a motor on each axis, the heat generation amount of the motor on each axis, the heat generation amount of an amplifier on each axis, and the output power amount of a control device, thereby calculating the power.

CITATION LIST

Patent Literature

Patent Literature 1: Japanese Patent Application Laid-open No. 2011-5623

SUMMARY

Technical Problem

However, Patent Literature 1 does not disclose a technique to calculate a power consumption amount. In a case where the method described in Patent Literature 1 is used to calculate the power consumption amount, it is conceivable to calculate the power, and further integrate the calculated power. However, with an amplifier in which the excess regenerative power that is generated is consumed by a regenerative resistor, because all of the regenerative power is not consumed by the regenerative resistor, there is a problem in that an accurate power consumption amount cannot be calculated by the method as described above.

The present invention has been achieved to solve the above problems, and an object of the present invention is to provide a power-consumption-amount estimation apparatus that can estimate the power consumption amount with a high degree of accuracy.

Solution to Problem

In order to solve the above problems and achieve the object, an aspect of the present invention is a power-consumption-amount estimation apparatus that estimates a power consumption amount of an industrial machine including a motor, a machine that is driven by the motor, and an amplifier that drives the motor. The power-consumption-amount estimation apparatus includes: an operation-pattern-information obtaining unit to obtain operation-pattern information that indicates an operation pattern of the machine or the motor; and a dynamics-information obtaining unit to obtain dynamics information that specifies dynamics of the machine and the motor. Moreover, the power-consumption-amount estimation apparatus includes a circuit-information obtaining unit to obtain amplifier information configured to include a resistance value of a rectifier, a capacitance of a smoothing capacitor, and a resistance value of a regenerative resistor, and motor information configured to include a winding resistance value of the motor, where the rectifier, the smoothing capacitor, and the regenerative resistor are included in the amplifier. Furthermore, the power-consumption-amount estimation apparatus includes a power-consumption-amount calculation unit to execute a process of calculating power of each of the motor and the regenerative resistor on the basis of the operation-pattern information, the dynamics information, the amplifier information, the motor information, and a bus voltage simulated value that simulates a bus voltage that is a voltage to be applied to the smoothing capacitor and of calculating power of the industrial machine on the basis of the calculated power of each of the motor and the regenerative resistor and execute a process of updating the bus voltage on the basis of the calculated power of each of the motor and the regenerative resistor and on the basis of the calculated power of the industrial machine, over a specified period of time; and to estimate a power consumption amount of the industrial machine by integrating the power of the industrial machine calculated over the specified period of time.

Advantageous Effects of Invention

According to the power-consumption-amount estimation apparatus of the present invention, an effect is obtained where it is possible to estimate the power consumption amount of an industrial machine with a high degree of accuracy.

DESCRIPTION OF EMBODIMENTS

A power-consumption-amount estimation apparatus according to embodiments of the present invention will be explained below in detail with reference to the accompanying drawings. The present invention is not limited to the embodiments.

First Embodiment

Figure 1:
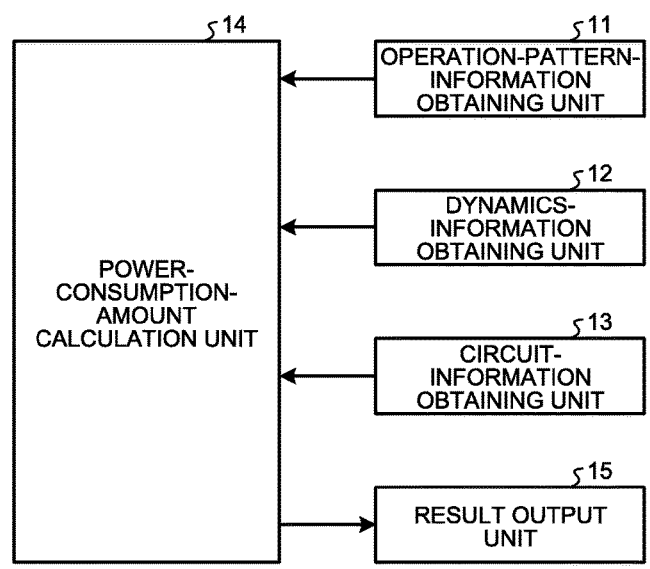
FIG. 1 is a diagram illustrating an example configuration of a power-consumption-amount estimation apparatus according to a first embodiment.

FIG. 1 is a diagram illustrating an example configuration of a power-consumption-amount estimation apparatus according to a first embodiment of the present invention. The power-consumption-amount estimation apparatus is configured to include an operation-pattern-information obtaining unit 11, which obtains operation-pattern information that indicates an operation pattern of a motor or a machine that is driven by the motor; a dynamics-information obtaining unit 12, which obtains information that specifies the dynamics, typically, the equation of motion of a motor, a machine that is driven by the motor, and other devices; a circuit-information obtaining unit 13, which obtains amplifier information and motor information described later; a power-consumption-amount calculation unit 14, which calculates a power consumption amount when a motor and a machine that is driven by the motor operate according to a predetermined operation pattern; and a result output unit 15, which outputs information on the power consumption amount, calculated by the power-consumption-amount calculation unit 14, to an external unit. The power-consumption-amount estimation apparatus illustrated in FIG. 1 obtains, from an external unit, various types of information related to an industrial machine as a simulation target, and estimates the power consumption amount of the industrial machine on the basis of the obtained information. The operation-pattern-information obtaining unit 11, the dynamics-information obtaining unit 12, and the circuit-information obtaining unit 13 are used when a user or the like sets the information necessary for the power-consumption-amount estimation apparatus to simulate the power consumption amount. The operations of the operation-pattern-information obtaining unit 11, the dynamics-information obtaining unit 12, the circuit-information obtaining unit 13, the power-consumption-amount calculation unit 14, and the result output unit 15, which constitute the power-consumption-amount estimation apparatus, are described in detail separately with reference to the flowcharts.

Each type of information, set by the operation-pattern-information obtaining unit 11, the dynamics-information obtaining unit 12, and the circuit-information obtaining unit 13, is transmitted to the power-consumption-amount calculation unit 14.

The amplifier information to be transmitted from the circuit-information obtaining unit 13 to the power-consumption-amount calculation unit 14 is configured to include information such as the resistance value of the regenerative resistor and the capacitance of a smoothing capacitor, where the regenerative resistor and the smoothing capacitor are constituents of the amplifier that drives the motor. The motor information is configured to include information such as the winding resistance value and the torque constant of the motor.

The power-consumption-amount calculation unit 14 uses the information that has been set from an external unit using the operation-pattern-information obtaining unit 11, the dynamics-information obtaining unit 12, and the circuit-information obtaining unit 13, i.e., the information received from each of the operation-pattern-information obtaining unit 11, the dynamics-information obtaining unit 12, and the circuit-information obtaining unit 13, to calculate a power consumption amount.

The result output unit 15 outputs the information on the power consumption amount, calculated by the power-consumption-amount calculation unit 14, to an external unit by means of displaying this information as textual information, graphical information, or other forms of information on a display unit such as a display device (not illustrated). It is also possible that the result output unit 15 outputs the information on the power consumption amount by means of printing it on a paper, or records this information in a storage medium such as a hard disk or a memory card. It is also possible that the result output unit 15 outputs the information on the power consumption amount that is a simulation result by using a plurality of methods such as both displaying the information on the display unit and recording it in a storage medium.

It is possible to implement the operation-pattern-information obtaining unit 11, the dynamics-information obtaining unit 12, the circuit-information obtaining unit 13, the power-consumption-amount calculation unit 14, and the result output unit 15, which are constituents of the power-consumption-amount estimation apparatus, by means of executing software, in which the process of each unit has been implemented, on a personal computer. However, the method for implementing these units is not limited thereto. It is also possible that the power-consumption-amount estimation apparatus is configured to execute each process of the above units on a web server and to set each type of information and display the result of the process via a web browser. Further, it is possible to implement the power-consumption-amount estimation apparatus as hardware that is configured as illustrated in FIG. 2.

Figure 2:
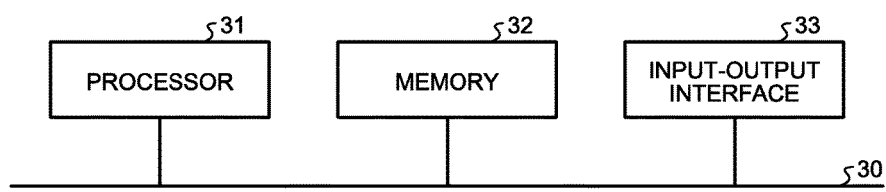
FIG. 2 is a diagram illustrating an example of a hardware configuration for implementing the power-consumption-amount estimation apparatus according to the first embodiment.

FIG. 2 is a diagram illustrating an example of the hardware configuration for implementing the power-consumption-amount estimation apparatus. It is possible to implement the power-consumption-amount estimation apparatus as a processor 31 such as a central processing unit (CPU) or a system large scale integration (LSI); a memory 32, which is constituted by a random access memory (RAM), a read only memory (ROM), and the like; and an input-output interface 33. The processor 31, the memory 32, and the input-output interface 33 are connected to a system bus 30.

Each of the operation-pattern-information obtaining unit 11, the dynamics-information obtaining unit 12, and the circuit-information obtaining unit 13 is implemented by storing a corresponding program in the memory 32 and executing the program stored in the memory 32 by the processor 31. Each of the operation-pattern-information obtaining unit 11, the dynamics-information obtaining unit 12, and the circuit-information obtaining unit 13 obtains each type of information to be used for the power-consumption-amount calculation unit 14 to calculate a simulated value of the power consumption amount from an external unit via the input-output interface 33.

The power-consumption-amount calculation unit 14 is implemented by storing its corresponding program in the memory 32 and executing this program stored in the memory 32 by the processor 31. Various types of information to be set in the power-consumption-amount calculation unit 14 are stored in a specified area of the memory 32.

The result output unit 15 is implemented by storing its corresponding program in the memory 32 and executing this program stored in the memory 32 by the processor 31. The result output unit 15 outputs the power consumption amount calculated by the power-consumption-amount calculation unit 14 to an external unit via the input-output interface 33.

Figure 3:
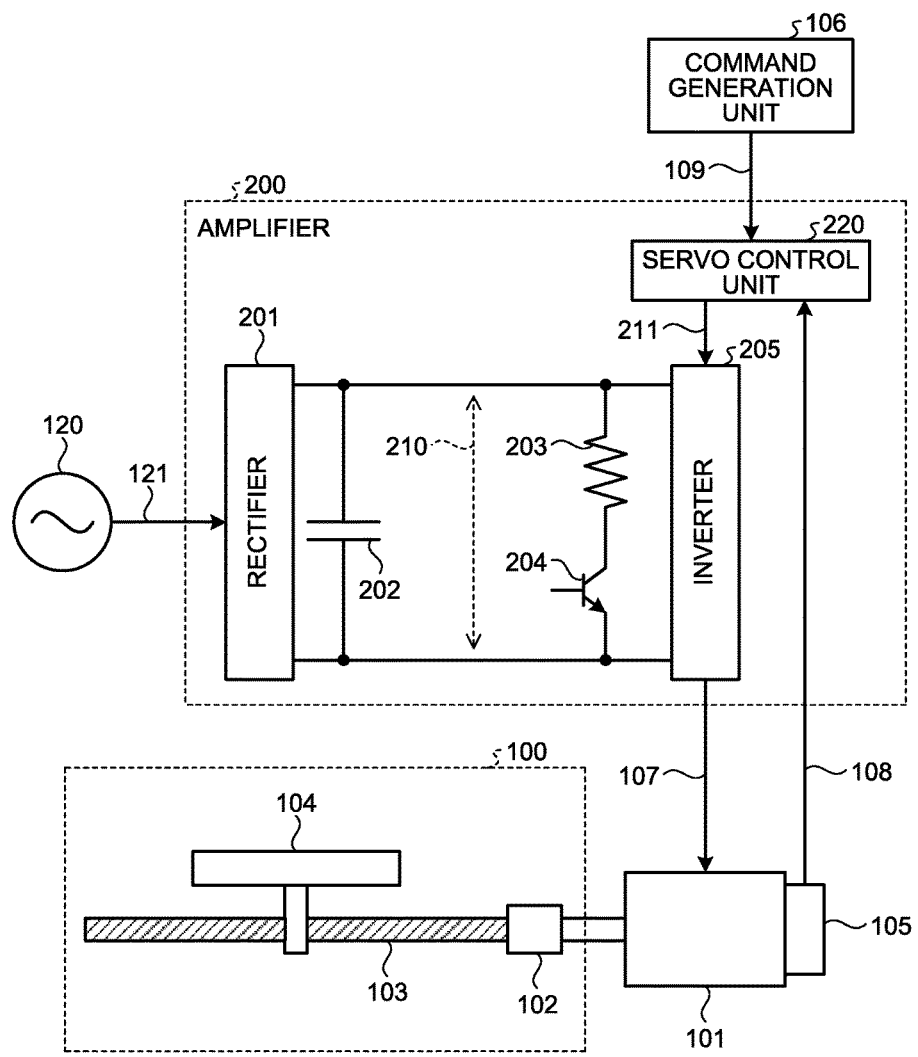
FIG. 3 is a diagram illustrating an example configuration of an industrial machine as a target for the power-consumption-amount estimation apparatus according to the first embodiment to derive a power consumption amount.

FIG. 3 is a diagram illustrating an example configuration of the industrial machine for which the power-consumption-amount estimation apparatus according to the first embodiment derives a power consumption amount from a simulation. The industrial machine illustrated in FIG. 3 is configured to include a motor, an amplifier, and a machine that is driven by the motor. In the present embodiment, an example case is described here, in which the power-consumption-amount estimation apparatus derives, from a simulation, a power consumption amount for a target industrial machine configured as illustrated in FIG. 3 when the industrial machine performs a positioning operation using a motor. FIG. 3 illustrates an example in which the industrial machine is a positioning control device. In the industrial machine illustrated in FIG. 3, a motor 101 is connected to a ball screw 103 through a coupling 102. The ball screw 103 converts rotational motion generated by the motor 101 to translational motion. The motor 101 rotates the ball screw 103 through the coupling 102 in order to position a table 104 mounted onto the ball screw 103. In FIG. 3, the machine includes the coupling 102, the ball screw 103, and the table 104. Hereinafter, the coupling 102, the ball screw 103, and the table 104 are collectively referred to as a "machine 100" for convenience of explanation. An encoder 105 is attached to the motor 101. The encoder 105 outputs a detection signal 108, which indicates the detection result of the rotor position and rotational speed of the motor 101, and the like. A command generation unit 106 generates an operation-pattern signal 109, which indicates the operation pattern of the motor 101 or the machine 100, and outputs the operation-pattern signal 109 to an amplifier 200, which drives the motor 101. The operation-pattern signal 109 is configured to include a position command value, a speed command value, and the like. In the present embodiment, the position command value is, for example, information that indicates the position of the table 104, which is a movable portion, at a certain time. The speed command value is, for example, information that indicates the movement speed of the table 104 at a certain time. The amplifier 200 supplies a current 107 to the motor 101 in such a manner that the detection signal 108 follows the operation-pattern signal 109, i.e., the operation of the motor 101 and the machine 100, indicated by the detection signal 108, follows the operation indicated by the operation-pattern signal 109.

The amplifier 200 outputs the current 107 by converting an AC voltage 121 supplied from an AC power supply 120 to a DC voltage. The amplifier 200 includes a rectifier 201, which is made up of a diode and other elements and rectifies the AC voltage 121; a smoothing capacitor 202, which smooths the voltage rectified by the rectifier 201; a regenerative resistor 203, which consumes regenerative power when regenerative power is excessively generated and therefore a bus voltage 210 reaches a specified value; a regenerative transistor 204, which is turned to an on-state when the bus voltage 210 reaches the specified value and causes the regenerative resistor 203 to consume the power stored in the smoothing capacitor 202; an inverter 205, which generates the current 107 to be supplied to the motor 101; and a servo control unit 220, which generates a voltage command 211 to be given to the inverter 205 on the basis of the operation-pattern signal 109 input from the command generation unit 106.

When the amplifier 200 generates the current 107 to be supplied to the motor 101, first, the rectifier 201 made up of a diode and other elements half-wave rectifies the AC voltage 121 supplied from the AC power supply 120. Next, the smoothing capacitor 202 smooths the voltage, having been half-wave rectified by the rectifier 201, and converts it to a DC voltage that is the bus voltage 210. The servo control unit 220 executes a feedback control such as a proportional integral derivative (PID) control in such a manner that the detection signal 108 input from the encoder 105 follows the operation-pattern signal 109 input from the command generation unit 106 in order to calculate the voltage command 211. The inverter 205 supplies the current 107 to the motor 101 by performing pulse width modulation (PWM) computation and the like on the bus voltage 210 and converting the power in such a manner that the voltage command 211 is applied to the motor 101.

Specific examples of the amplifier 200 include an amplifier made up of a servo amplifier that includes a regenerative resistor for consuming regenerative power and a circuit for causing the regenerative resistor to consume regenerative power and a general-purpose inverter. The amplifier that includes a circuit for causing the regenerative resistor to consume regenerative power is characterized in that the amplifier price is lower than an amplifier that includes a power-supply regenerative converter that returns regenerative power to the power supply when it is generated.

Figure 4:
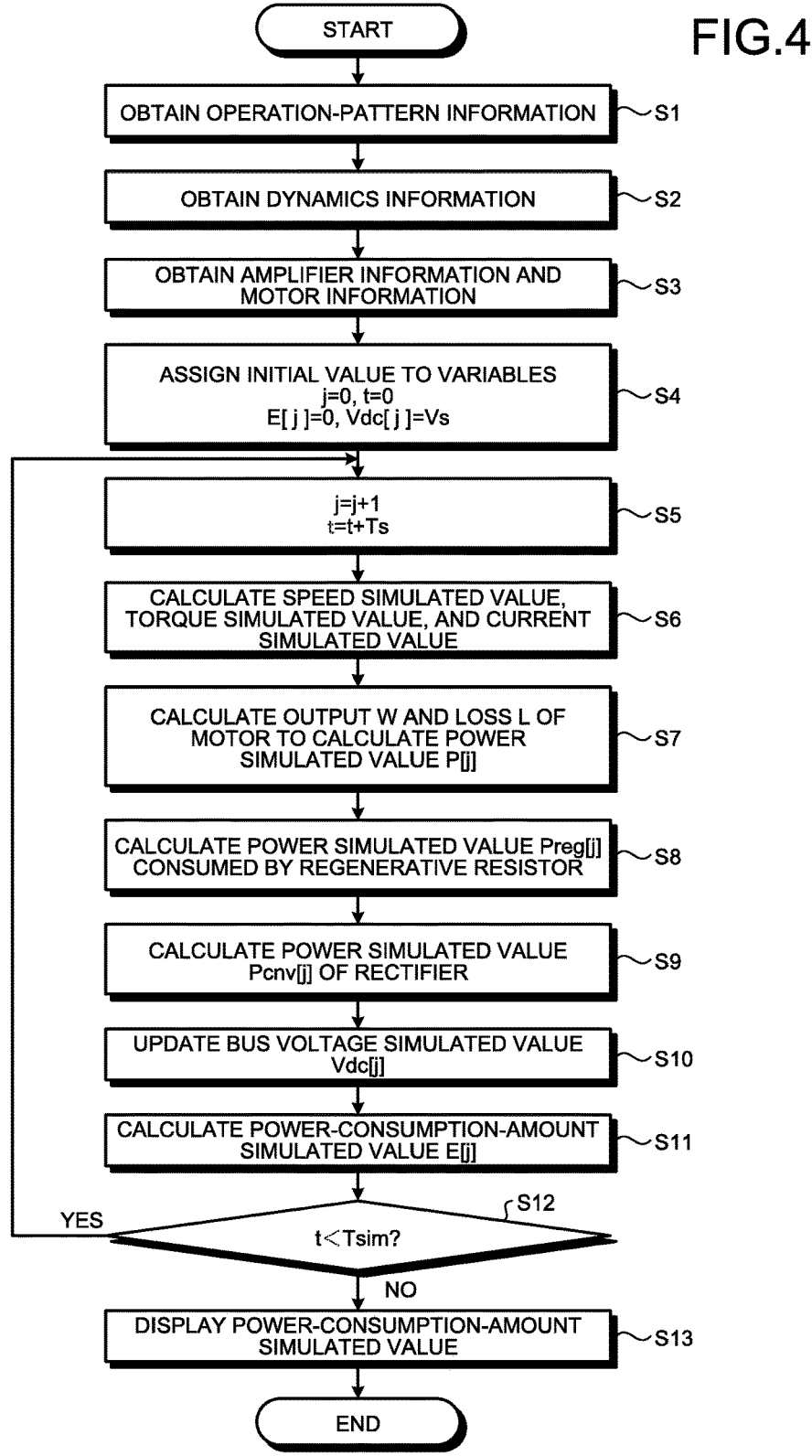
FIG. 4 is a flowchart illustrating an example of a power-consumption-amount estimating operation of the power-consumption-amount estimation apparatus according to the first embodiment.

FIG. 4 is a flowchart illustrating an example of the power-consumption-amount estimating operation of the power-consumption-amount estimation apparatus according to the first embodiment, i.e., the operation of the power-consumption-amount estimation apparatus to perform a simulation to estimate the power consumption amount of the industrial machine.

When the power-consumption-amount estimation apparatus performs a simulation to estimate the power consumption amount, the power-consumption-amount estimation apparatus first obtains operation-pattern information from an external unit (Step S1). Specifically, the operation-pattern-information obtaining unit 11 obtains various types of information from an external unit, such as the amount of movement, speed, acceleration time, and deceleration time during the positioning operation, and dwell time, which is a waiting time between the positioning operations. The operation-pattern-information obtaining unit 11 then transmits the obtained information to the power-consumption-amount calculation unit 14 as operation-pattern information that is the information to specify the operation pattern. Upon receiving the operation-pattern information from the operation-pattern-information obtaining unit 11, the power-consumption-amount calculation unit 14 stores therein the received operation-pattern information.

On the basis of the operation-pattern information received from the operation-pattern-information obtaining unit 11, the power-consumption-amount calculation unit 14 can uniquely determine a command signal for operating the motor 101. After determining the command signal for operating the motor 101, the power-consumption-amount calculation unit 14 can determine a position command X*(t) and a speed command V*(t) with respect to time "t" for the machine 100 or the motor 101. At Step S1, simultaneously with these commands, a time Tsim for performing a simulation is input from the operation-pattern-information obtaining unit 11 to the power-consumption-amount calculation unit 14. From the time 0 to the time Tsim, the power-consumption-amount calculation unit 14 calculates, by simulation, the power consumption amount when the motor 101, the machine 100, and other devices operate according to the operation pattern set at Step S1. This is described later in detail.

Figure 5:
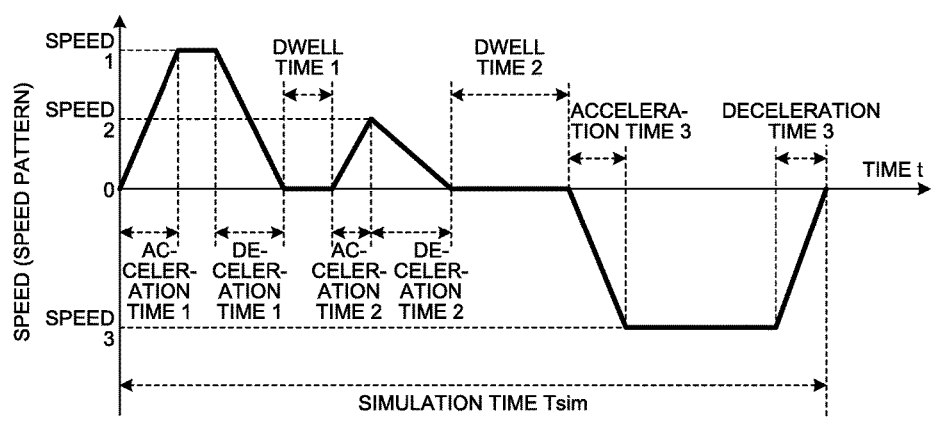
FIG. 5 is a diagram illustrating an example of an operation pattern indicated by operation-pattern information obtained by the power-consumption-amount estimation apparatus according to the first embodiment.

For example, the operation pattern, indicated by the operation-pattern information obtained at Step S1, is a speed pattern illustrated in FIG. 5. In FIG. 5, the horizontal axis represents the simulation time Tsim, and this simulation time Tsim shows the elapsed time since the start of operation. The vertical axis represents the speed, i.e., the movement speed of the table 104. The area of the trapezoidal and triangular speed patterns is equivalent to the amount of movement of the table 104 during the positioning operation. As illustrated in FIG. 5, it is possible that the operation pattern is not formed of only a single positioning operation but it is formed of a plurality of positioning operations with dwell time that is a waiting time interposed between them so as to position the table 104 in a sequential manner. It is obvious that the operation pattern can be formed of a single positioning operation. The operation pattern illustrated in FIG. 5 is formed of three positioning operations with dwell times inserted between them. The operation-pattern information is not limited to the above information. Any operation-pattern information can be used as long as it can uniquely determine the operation pattern of the machine 100 or the motor 101.

Next, the power-consumption-amount estimation apparatus obtains dynamics information (Step S2). Specifically, the dynamics-information obtaining unit 12 obtains, from an external unit, dynamics information, which is the information for specifying the dynamics of the motor 101 and the machine 100, and transmits the obtained information to the power-consumption-amount calculation unit 14. Upon receiving the dynamics information from the dynamics-information obtaining unit 12, the power-consumption-amount calculation unit 14 stores therein the received dynamics information.

For example, when the power-consumption-amount estimation apparatus performs a simulation of the industrial machine illustrated in FIG. 3, the dynamics-information obtaining unit 12 obtains information such as the moving inertia of the machine 100 attributable to the rotational operation of the motor 101 and the friction attributable to the rotational operation of the motor 101 as dynamics information. The moving inertia of the machine 100 indicates a sum value J of the inertia of the sections moving with the rotations of the motor 101. In the industrial machine illustrated in FIG. 3, the moving inertia is equivalent to the sum value of the inertia of the motor 101, the coupling 102, the ball screw 103, and the table 104. As the information on the friction attributable to the rotational operation of the motor 101, a Coulomb-friction torque "c", a viscous-friction torque coefficient "d", and the like are considered. The Coulomb-friction torque "c" is applied at a constant torque in a direction to interfere with the rotational operation of the motor 101. The viscous-friction torque coefficient "d" is a proportionality coefficient of the viscous-friction torque that increases in proportion to the speed of the motor 101. On the basis of the dynamics information, the power-consumption-amount calculation unit 14 can uniquely determine the dynamics of the machine 100 and the motor 101, i.e., determine the equation of motion expressed by the following equation (1).

[Equation 1]

$$J \cdot a = \tau - c - d \cdot v \tag{1}$$

In the equation (1), "a" represents the acceleration of the motor 101, "τ" represents the torque of the motor 101, and "v" represents the speed of the motor 101.

For example, in the case where the table 104 is configured to move in the vertical direction, the table 104 is affected by gravity. Therefore, gravity information may be input as the dynamics information. However, this is not the case with the industrial machine illustrated in FIG. 3 because the table 104 moves in the horizontal direction. The information, to be obtained from an external unit by the dynamics-information obtaining unit 12 and transmitted to the power-consumption-amount calculation unit 14, is not limited to the above examples. Any information can be obtained and transmitted as long as the information specifies the dynamics of the motor 101 and the machine 100.

Next, the power-consumption-amount estimation apparatus obtains amplifier information and motor information (Step S3). Specifically, the circuit-information obtaining unit 13 obtains, from an external unit, information on amplifier-related constants. More specifically, the information on amplifier-related constants is a capacitance value C of the smoothing capacitor 202, a resistance value Rreg of the regenerative resistor 203, a voltage value Von at which the regenerative transistor 204 is turned on, a resistance value Rcnv of the rectifier 201, a voltage wave-height value Vs of the AC power supply 120, and a power-supply frequency "ω" of the AC power supply 120. The circuit-information obtaining unit 13 then transmits the obtained information as amplifier information to the power-consumption-amount calculation unit 14. Further, the circuit-information obtaining unit 13 obtains, from an external unit, a winding resistance value R of the motor 101 and a torque constant Kt that represents the magnitude of torque to be generated per unit current in the motor 101, and then transmits the obtained values as motor information to the power-consumption-amount calculation unit 14. At this time, the circuit-information obtaining unit 13 additionally obtains a sample time Ts that represents the duration for which the power-consumption-amount estimation apparatus performs a simulation, and then transmits the obtained sample time Ts to the power-consumption-amount calculation unit 14. The sample time Ts is set at a miniscule value. Preferably, a value ranging approximately from 1 μsec (0.000001 sec) to 10 msec (0.01 sec) is set as a specific example of the sample time Ts. Upon receiving the amplifier information, the motor information, and the sample time Ts from the circuit-information obtaining unit 13, the power-consumption-amount calculation unit 14 stores therein all of the received information. The power-consumption-amount calculation unit 14 calculates the power-consumption-amount simulated value of the industrial machine each time the sample time Ts has elapsed. This is described later in detail.

Steps S1 to S3 described above may be performed in the opposite order.

Next, the power-consumption-amount estimation apparatus assigns an initial value to variables to be used in the process of calculating a power consumption amount (Step S4). Specifically, the power-consumption-amount calculation unit 14 sets j=0, t=0, E[j]=0, and Vdc[j]=Vs. The variable "j" represents an array index. "t" represents time, that is, the elapsed time since the motor 101, the machine 100, and the amplifier 200 start the operation indicated by the operation-pattern information obtained at Step S1 described above. E[j] represents the simulated value of the power consumption amount of the industrial machine illustrated in FIG. 3, which is calculated by simulation at time t=j·Ts. Vdc[j] represents the bus voltage simulated value calculated by simulation at time t=j·Ts. Step S4 and Steps S5 to S12 described later are the processes to be executed by the power-consumption-amount calculation unit 14. For example, when Steps S1 to S3 are executed, and therefore the power-consumption-amount calculation unit 14 has completely received the operation-pattern information, the dynamics information, the amplifier information, and the motor information, then the power-consumption-amount calculation unit 14 executes Step S4 and the subsequent steps. It is also possible that the power-consumption-amount calculation unit 14 executes Step S4 and the subsequent steps upon having received a command to start the power-consumption-amount calculation process from a user through an operation unit (not illustrated in FIG. 1).

The power-consumption-amount calculation unit 14 executes Step S4 to initialize the variables and then increments the index "j" by 1, and it also increases the parameter "t" that represents time by the sample time Ts. That is, the power-consumption-amount calculation unit 14 sets j=j+1 and t=t+Ts (Step S5).

Subsequently, the power-consumption-amount calculation unit 14 uses each type of information obtained at Steps S1 to S3 to calculate a speed simulated value V, a torque simulated value "τ", and a current simulated value I as simulated values of the speed and torque of the motor 101 at time "t" and as a simulated value of the current that flows through the motor 101 at time "t" (Step S6). Specifically, the power-consumption-amount calculation unit 14 sets the speed simulated value V at time "t" as V=V*(t) when the operation-pattern information obtained at Step S1 indicates a speed command pattern. The power-consumption-amount calculation unit 14 differentiates the speed command V* (t) to additionally calculate an acceleration simulated value A at time "t". When the operation-pattern information obtained at Step S1 indicates a position command pattern, the power-consumption-amount calculation unit 14 differentiates the position command X* (t) to calculate the speed simulated value V at time "t", and further it differentiates the calculated speed simulated value V to calculate the acceleration simulated value A at time "t".

The power-consumption-amount calculation unit 14 calculates the torque simulated value "τ" by using the equation of motion expressed as the aforementioned equation (1), defined by the dynamics information obtained at Step S2, and by using the calculated speed simulated value V and acceleration simulated value A described above. In the case where the power-consumption-amount estimation apparatus performs a simulation of a target that is the industrial machine configured as illustrated in FIG. 3, the power-consumption-amount calculation unit 14 calculates the torque simulated value "τ" according to the following equation (2).

[Equation 2]

$$\tau = J \cdot A + c + d \cdot V \tag{2}$$

The power-consumption-amount calculation unit 14 additionally calculates the current simulated value I that flows through the motor 101. The power-consumption-amount calculation unit 14 uses the calculated torque simulated value "τ" and the motor torque constant Kt described above to calculate the current simulated value I from I=τ/Kt.

While in the present embodiment, the current simulated value I is calculated by using the motor torque constant Kt as an example, the calculation of the current simulated value I is not limited thereto. Generally, the value of the torque constant is equal to the value of an induced-voltage constant. Therefore, it is also possible to use the induced-voltage constant instead of the torque constant to calculate the current simulated value from the torque simulated value. Further, given that a case is simulated where an induction motor is used instead of a servo motor, storing a table that represents a torque-current relation, storing this relation as a function, or any other methods can be employed as long as the information allows the current simulated value I to be calculated from the torque simulated value "τ".

Next, the power-consumption-amount calculation unit 14 calculates an output W and a loss L of the motor 101 at time t=j·Ts to calculate a power simulated value P[j], which is a simulated value of the power consumed by the motor 101 (Step S7). Specifically, the power-consumption-amount calculation unit 14 first uses the aforementioned speed simulated value V and motor torque simulated value "τ" to calculate the output W of the motor 101 according to the following equation (3).

[Equation 3]

$$W = V \cdot \tau \quad (3)$$

The calculation method for the motor output W is not limited to the above method. For example, it is also possible that information on the inductance value of the motor 101 is further input to calculate the simulated value of the voltage to be applied to the motor 101 on the basis of the resistance value and the inductance value of the motor 101, and then the voltage simulated value is multiplied by the current simulated value to calculate the output W. The output derived from the above calculation method and the aforementioned equation (3) can also be applied to the case where the motor 101 is either a three-phase motor or a two-phase motor.

Further, the power-consumption-amount calculation unit 14 uses the aforementioned current simulated value I and winding resistance R of the motor 101 to calculate the loss L according to the following equation (4).

[Equation 4]

$$L = R \cdot I^2 \quad (4)$$

While in the equation (4), a copper loss that depends on the square of the current value is calculated as the loss L, for example, the calculation of the loss L is not limited to a copper loss. For another example, it is also possible to calculate an iron loss that depends on the speed and the current value as the loss L. The current simulated value I and the speed simulated value V are used to calculate the iron loss. Coefficients used for calculating the iron loss are obtained at Step S3 described above. It is also possible that the power-consumption-amount calculation unit 14 calculates both the iron loss and the copper loss and uses the sum of these losses as the loss L. It is further possible that the power-consumption-amount calculation unit 14 not only calculates a motor-related loss such as a copper loss and an iron loss but also calculates a loss related to the inverter 205 and includes these losses into the loss L.

After calculating the output W and the loss L of the motor 101, the power-consumption-amount calculation unit 14 calculates the power simulated value P[j] at time t=j·Ts according to the following equation (5).

[Equation 5]

$$P[j] = W + L \quad (5)$$

The process mentioned above is executed at Step S7.

Subsequently, the power-consumption-amount calculation unit 14 calculates a power simulated value Preg[j], which is a simulated value of the power consumed by the regenerative resistor 203 at time t=j·Ts (Step S8). At Step S8, the power-consumption-amount calculation unit 14 calculates the power simulated value Preg[j], while determining whether the regenerative resistor 203 is energized, by using a bus voltage simulated value Vdc[j−1]. Specifically, the power-consumption-amount calculation unit 14 calculates Preg[j] according to the following equation (6).

[Equation 6]

when $Vdc[j-1] \geq Von$ $Preg[j] = Vdc[i-1]^2 / Rreg$ when $Vdc[j-1] < Von$ $$Preg[j] = 0 \quad (6)$$

Next, the power-consumption-amount calculation unit 14 calculates a power simulated value Pcnv[j] of the rectifier 201, which is a simulated value of the power output by the rectifier 201 at time t=j·Ts (Step S9). At Step S9, the power-consumption-amount calculation unit 14 calculates the power simulated value Pcnv[j] on the basis of the result of a comparison between the bus voltage simulated value Vdc[j−1] and the output-voltage simulated value Vcnv of the rectifier 201. Specifically, the power-consumption-amount calculation unit 14 calculates Pcnv[j] according to the following equation (7).

[Equation 7]

$Vdc[j-1] \leq Vcnv$ $Pcnv[j] = (Vcnv - Vdc[j-1])^2 / Rcnv$ $Vdc[j-1] > Vcnv$ $$Pcnv[j] = 0 \quad (7)$$

The output-voltage simulated value Vcnv of the rectifier 201 is calculated according to the following equation (8).

[Equation 8]

$$Vcnv = Vs \cdot \max(Vs \cdot \sin(\omega \cdot t), Vs \cdot \sin(\omega \cdot t - 120°), Vs \cdot (\omega \cdot t - 240°)) \quad (8)$$

max (α, β, γ) is a function that outputs the maximum value among "α", "β", and "γ".

Subsequently, the power-consumption-amount calculation unit 14 updates the bus voltage simulated value Vdc[j], which is a simulated value of the bus voltage 210 (Step S10). Specifically, the power-consumption-amount calculation unit 14 updates the bus voltage simulated value Vdc[j] according to the following equation (9) by using the bus voltage simulated value Vdc[j−1] at the previous sample time, the power simulated value P[j] calculated at Step S7, the power simulated value Preg[j] consumed by the regenerative resistor 203 calculated at Step S8, the power simulated value Pcnv[j] of the rectifier 201 calculated at Step S9, the capacitance C of the smoothing capacitor 202, and the sample time Ts.

[Equation 9]

$$Vdc[j] = Vdc[j-1] + Ts/(C \cdot Vdc[j-1]) \cdot (-P[j] - Preg[j] + Pcnv[j]) \quad (9)$$

Next, the power-consumption-amount calculation unit 14 calculates a power-consumption-amount simulated value E[j], which is a simulated value of the power consumption amount of the industrial machine (Step S11). Specifically, the power-consumption-amount calculation unit 14 uses the power-consumption-amount simulated value E[j−1] at the previous sample time, the power simulated value Pcnv[j] of the rectifier 201, and the sample time Ts to calculate the power-consumption-amount simulated value E[j] according to the following equation (10). The process illustrated in the following equation (10) corresponds to the process of integrating the power simulated value Pcnv[j] of the rectifier 201.

[Equation 10]

$$E[j]=E[j-1]+Pcnv[j]\cdot Ts \quad (10)$$

Subsequently, the power-consumption-amount calculation unit 14 determines whether the parameter "t" that represents time is smaller than a simulation end time Tsim (Step S12). When "t" is smaller than Tsim (YES at Step S12), the process of the power-consumption-amount calculation unit 14 returns to Step S5 to execute again Steps S5 to S11 described above. When "t" is equal to or greater than Tsim (NO at Step S12), the power-consumption-amount calculation unit 14 ends the process of calculating the power-consumption-amount simulated value, i.e., ends the repetition of Steps S5 to S11 described above. Further, the result output unit 15 displays the power-consumption-amount simulated value calculated by the power-consumption-amount calculation unit 14 on the display unit, such as a display (not illustrated in FIG. 1) (Step S13). As an operation of the result output unit 15 to display the power-consumption-amount simulated value on the display unit, it is conceivable to display the temporal transition of the power-consumption-amount simulated value E[j] as a graph, or display the power-consumption-amount simulated value at time t=Tend, at which a series of operations are finished, as the power consumption amount needed for a series of operation patterns. However, the display operation of the result output unit 15 is not limited thereto. It is also possible that the result output unit 15 does not solely display the temporal transition of the power-consumption-amount simulated value but relates the simulated value to the operation pattern and displays them on the display unit. It is further possible that the result output unit 15 executes the process of displaying the power-consumption-amount simulated value as textual information, printing a graph of the power-consumption-amount simulated value on a paper, printing information on the power-consumption-amount simulated value on a paper, or storing the information on the power-consumption-amount simulated value in a storage medium at Step S13. Furthermore, in the case where the power-consumption-amount estimation apparatus is configured to execute the process of calculating the power-consumption-amount simulated value on the web server, it is possible that the result output unit 15 transmits information on the power-consumption-amount simulated value, calculated by the power-consumption-amount calculation unit 14, to a client computer (a web browser) through a communication line such as the Internet in order to display the information on the client computer.

As described above, the power-consumption-amount estimation apparatus calculates the power consumption amount of the motor 101 and the power consumption amount of the machine 100 connected to the motor 101 by simulation according to the flowchart in FIG. 4, and it also outputs the calculated power consumption amounts to an external unit by displaying them or other methods. With this operation, a user of the power-consumption-amount estimation apparatus can recognize the power consumption amount when the machine 100 and the motor 101, both of which are constituents of the industrial machine, operate according to a predetermined operation pattern with no time and effort used to actually operate the machine 100, the motor 101, and other devices.

Next, the effects of the present embodiment are described, particularly, the reasons the power consumption amount can be accurately simulated by calculating the power-consumption-amount simulated value according to the flowchart in FIG. 4. An example case is described in which the power-consumption-amount estimation apparatus targets the industrial machine illustrated in FIG. 3 to calculate a power simulated value.

The motor operation is categorized into a powering operation in which the motor consumes energy to work and a regenerative operation in which the motor generates energy. In the industrial machine illustrated in FIG. 3, regenerative power, generated when the motor 101 performs the regenerative operation, is not always consumed by the regenerative resistor 203. That is, the regenerative power, generated when the motor 101 performs the regenerative operation, is sometimes consumed by the regenerative resistor 203 and is sometimes stored in the smoothing capacitor 202 included in the amplifier 200 and reused later. The regenerative power is originally kinetic energy of the motor 101 and the machine 100 made up of the coupling 102, the ball screw 103, and the table 104. The amplifier 200 supplies the kinetic energy to the motor 101 and the machine 100 as power. Therefore, in order to accurately derive, from a simulation, a power consumption amount, which is consumed by the motor 101 and the amplifier 200 when the machine 100 is driven by using the motor 101, it is necessary to accurately simulate how the regenerative power is handled.

In order to understand the behavior of this regenerative power, the energy to be stored in the smoothing capacitor 202 is focused on and analyzed below. Where the bus voltage 210 in the amplifier 200 is represented as a bus voltage vdc, the energy to be stored in the smoothing capacitor 202 is expressed as $\frac{1}{2}\cdot C\cdot vdc^2$ by using the bus voltage vdc and the capacitance C of the smoothing capacitor 202. "^2" represents raising the value to the power of 2, and therefore "vdc^2" represents raising the bus voltage vdc to the power of 2. The energy to be stored in the smoothing capacitor 202 decreases as the motor 101 consumes power. When the regenerative resistor 203 consumes power, the energy to be stored in the smoothing capacitor 202 also decreases. Further, the energy to be stored in the smoothing capacitor 202 is increased as power is supplied from the rectifier 201. Where the power consumed by the motor 101 is represented as "p", the power consumed by the regenerative resistor 203 is represented as preg, and the power supplied from the rectifier 201 is represented as pcnv, and where the relation between the above factors is expressed from the viewpoint of the time variation in the amount of energy, then the following equation (11) holds.

[Equation 11]

$$\frac{d}{dt}\left(\frac{1}{2}C\cdot Vdc^2\right)=-P-Preg+Pcnv \quad (11)$$

When the differentiation formula for the composite function expressed as the following equation (12) is used, the equation (11) is expressed as the following equation (13). Therefore, the differential equation that shows the time variation in the bus voltage vdc is obtained.

[Equation 12]

$$\frac{d}{dt}\left(\frac{1}{2} C \cdot Vdc^2\right) = C \cdot Vdc \cdot \frac{dVdc}{dt} \quad (12)$$

[Equation 13]

$$\frac{dVdc}{dt} = \frac{1}{C \cdot Vdc}(-P - Preg + Pcnv) \quad (13)$$

The bus voltage simulated value Vdc[j] at time t=j·Ts is simulated at every sampling cycle Ts according to the differential equation expressed as the equation (13), which is the process at Step S10 in FIG. 4. The following equation (14) is obtained by discretizing the left-hand side of the equation (13) using the sample time Ts.

[Equation 14]

$$\frac{dVdc}{dt} \approx \frac{Vdc[i] - Vdc[i-1]}{Ts} \quad (14)$$

The aforementioned equation (9) is obtained by substituting the relation expressed by the equation (14) into the equation (13), and further substituting Vdc[j] for vdc, P[j] for "p", Preg[j] for preg, and Pcnv[j] for pcnv, respectively.

In the present embodiment, in order to simulate the equation (13), the differential computation is approximated by using a difference computation in the equation (14), which is the Euler approximation. However, the method for simulating the relation in the equation (13) is not limited thereto. For example, the Runge-Kutta method, the Heun method, or any other method can also be used.

Meanwhile, each value of the power "p", the power preg consumed by the regenerative resistor, and the power pcnv supplied by the rectifier in the equation (13) is not a constant value, but varies over time in accordance with the bus voltage value and the motor operation. How these values are simulated is described next.

First, the power consumption amount "p" consumed by the motor 101 is considered. The power consumption amount "p" consumed by the motor 101 is expressed as the sum of the output and loss of the motor 101. At Steps S1 and S2 in the flowchart illustrated in FIG. 4, information regarding the operation pattern of the motor 101 and the equation of motion attributable to the operation of the motor 101 is input to the power-consumption-amount calculation unit 14. Therefore, the power-consumption-amount calculation unit 14 can determine the speed and torque of the motor 101 at an arbitrary time "t". The power-consumption-amount calculation unit 14 calculates simulated values of the speed and torque of the motor 101 at Step S6. Upon determining the speed and torque of the motor 101, the power-consumption-amount calculation unit 14 can calculate the output W of the motor 101 according to the above equation (3). Upon determining the torque of the motor 101, the power-consumption-amount calculation unit 14 can also calculate the loss incurred by the current that flows through the motor 101. That is, first, the power-consumption-amount calculation unit 14 uses the torque and the torque constant Kt of the motor 101 to calculate the current that flows through the motor 101, and then it uses the calculated current and the motor winding resistance R so as to calculate the loss L incurred by the current that flows through the motor 101. The loss L can be calculated according to the above equation (4). On the basis of the sum value of the output W and the loss L of the motor 101, the power-consumption-amount calculation unit 14 calculates the power "p", consumed by the motor 101, as P[j] at every sampling cycle Ts, which is the process at Step S7. The power P[j] is expressed by the above equation (5).

Next, the power preg consumed by the regenerative resistor 203 is considered. When the bus voltage vdc is equal to or higher than an ON-voltage Von of the regenerative transistor 204, that is, when vdc≥Von, the regenerative transistor 204 is energized, and therefore a current vdc/Rreg flows through the regenerative resistor 203. Rreg represents the resistance value of the regenerative resistor 203. On the basis of the product of current and voltage, the power preg consumed by the regenerative resistor 203 can be calculated by preg=vdc^2/Rreg. In contrast, when vdc<Von, the regenerative transistor 204 is not energized. Therefore, a current does not flow through the regenerative resistor 203, and accordingly power is not consumed, which results in preg=0. The power preg consumed by the regenerative resistor 203 is calculated at every sampling cycle Ts at Step S8. preg is expressed as Preg[j] in the above equation (6).

Next, the power pcnv is considered, which is supplied from the rectifier 201 to the smoothing capacitor 202 and the circuits at the stage subsequent to the smoothing capacitor 202. The rectifier 201 supplies power toward the smoothing capacitor 202 as the bus voltage vdc becomes lower than the output voltage vcnv of the rectifier 201. That is, when vdc<vcnv, a current according to the voltage difference (vcnv−vdc) flows from the rectifier 201 toward the smoothing capacitor 202. By using the resistance value Rcnv of the rectifier 201, a current that flows from the rectifier 201 toward the smoothing capacitor 202 is represented as (vcnv−vdc)/Rcnv. Therefore, the power pcnv supplied from the rectifier 201 toward the smoothing capacitor 202 is expressed as pcnv=(vcnv−vdc)^2/Rcnv. In contrast to this, when the bus voltage vdc is equal to or higher than the output voltage vcnv of the rectifier 201, i.e., when vdc≥vcnv, then power is not supplied from the rectifier 201 toward the smoothing capacitor 202, which results in pcnv=0. The power pcnv to be supplied from the rectifier 201 toward the smoothing capacitor 202 is calculated at every sampling cycle Ts at Step S9. pcnv is expressed as Pcnv[j] in the above equation (7).

The power of the motor 101 and the amplifier 200 is equal to the power supplied from the rectifier 201 to the smoothing capacitor 202. Therefore, the power consumption amount of the motor 101 and the amplifier 200 is obtained by integrating the power pcnv supplied from the rectifier 201 to the smoothing capacitor 202. This process corresponds to Step S11. The power consumption amount of the motor 101 and the amplifier 200 is expressed as E[j] in the above equation (10).

As described above, the power-consumption-amount estimation apparatus according to the present embodiment uses operation-pattern information, dynamics information on the machine 100 and the motor 101, amplifier information such as a capacitance value of the smoothing capacitor 202, which is a constituent of the amplifier 200, and motor information such as a winding resistance value of the motor 101, each of which has been set by an external unit, to perform the calculation as described above at each time point from the time 0 to the time Tsim at which the motor 101 and the machine 100 finish a series of operations, in order to calculate a power consumption amount. Therefore, the power-consumption-amount estimation apparatus can estimate an accurate power consumption amount of the motor 101 and the machine 100 by simulation.

Further, when the power-consumption-amount estimation apparatus according to the present embodiment estimates a power consumption amount by simulation, the power-consumption-amount estimation apparatus uses an equation that focuses on the time variation in the amount of energy stored in the smoothing capacitor 202 in the amplifier 200, such as the above equation (9), or the equation (11) or the equation (13) equivalent to the equation (9), so as to perform the simulation including the behavior of the bus voltage 210 without performing the PWM computation in the inverter 205 or simulating complicated behavior of an insulated gate bipolar transistor (IGBT) element, such as an on/off state. With this operation, the power-consumption-amount estimation apparatus can prevent an increase in computation amount of the processes of simulating the power consumption amount, and it can also estimate the power consumption amount with a high degree of accuracy.

Furthermore, the power-consumption-amount estimation apparatus according to the present embodiment simulates the power, taking into account whether regenerative power generated in the motor 101 is consumed by the regenerative resistor 203 or not consumed by the regenerative resistor 203 but stored in the smoothing capacitor 202. Therefore, the power-consumption-amount estimation apparatus can accurately calculate the power consumption amount. In the case where the machine 100 is actually operated by using the motor 101, when the motor 101 performs a regenerative operation, a phenomenon occurs in which the bus voltage 210 in the amplifier 200 is increased, and when it exceeds a certain constant value, then the regenerative transistor 204 is energized, and therefore the regenerative resistor 203 consumes the regenerative power. The power-consumption-amount estimation apparatus according to the present embodiment simulates a phenomenon in which when the toque and speed of the motor 101 have opposite signs to each other, the output W of the motor 101 becomes negative, and then the absolute value of the output W of the motor 101 exceeds the loss L, the power simulated value P[j] becomes negative, thereby generating regenerative power. When the power simulated value P[j] becomes negative, the bus voltage simulated value Vdc[j], derived from the above equation (9) at Step S10 illustrated in FIG. 4, varies such that it exhibits an increasing trend. This corresponds to a simulation of the operation in which regenerative power is stored in the smoothing capacitor 202. Further, the power-consumption-amount estimation apparatus according to the present embodiment simulates a phenomenon in which, when regenerative power is continuously generated, the bus voltage simulated value Vdc[j] continues to be increased, and when this bus voltage simulated value Vdc[j] is increased to the ON-voltage Von of the regenerative transistor 204, then the power simulated value Preg[j], consumed by the regenerative resistor 203, becomes positive at Step S8 in FIG. 4. When the power simulated value Preg[j], consumed by the regenerative resistor 203, becomes positive, the bus voltage simulated value Vdc[j] varies such that it exhibits a decreasing trend at Step S10. This corresponds to a simulation of a phenomenon in which a portion of the regenerative power stored in the smoothing capacitor 202 is consumed by the regenerative resistor 203.

It is common that when an industrial machine performs a positioning operation using a motor, the accelerating operation and the constant-speed maintaining operation are performed as a powering operation, while the decelerating operation is performed as a regenerative operation. The power-consumption-amount estimation apparatus according to the present embodiment can accurately simulate the power consumption amount when the motor operates according to the operation pattern illustrated as an example in FIG. 5, i.e., a power consumption amount when the motor operates while repeating the powering operation and the regenerative operation alternately. In practice, immediately after the motor 101 has performed the regenerative operation, all of the regenerative power generated in the motor 101 is not consumed by the regenerative resistor 203. When the bus voltage 210 is increased due to the generation of regenerative power and then further increased to the ON-voltage Von of the regenerative transistor 204, then the regenerative power is consumed by the regenerative resistor 203. There is a case where, although the motor 101 performs a regenerative operation, the bus voltage 210 is not increased to the ON-voltage Von of the regenerative transistor 204, i.e., there is a case where the bus voltage 210 is increased to a certain degree. In that case, when the motor 101 performs a powering operation, energy stored in the smoothing capacitor 202 is used as energy for the powering operation. Therefore, a phenomenon occurs in which the power consumption amount of the amplifier 200, the motor 101, and the machine 100 is not increased significantly. In regard to this phenomenon, in the power-consumption-amount estimation apparatus according to the present embodiment, when the bus voltage simulated value Vdc[j] is greater than the output voltage Vcnv of the rectifier 201, the power simulated value of the rectifier 201 becomes 0, that is, Pcnv[j]=0 in the process at Step S9 in FIG. 4, and therefore the power-consumption-amount simulated value E[j] obtained by integrating Pcnv[j] at Step S11 also becomes smaller.

In the present embodiment, an example case has been described in which the power-consumption-amount estimation apparatus simulates the power consumption amount of the industrial machine configured as illustrated in FIG. 3, i.e., an industrial machine that executes a positioning control on the table by the rotary motor using the ball screw. However, the present embodiment is not limited to this example. For example, it is also possible to derive the power consumption amount of an industrial machine configured to use a timing belt, a rack-and-pinion, a conveyor, and other devices from a simulation. Further, it is possible to derive the power consumption amount of a mechanism such as a robot arm from a simulation. No matter how an industrial machine, targeted for obtaining the power consumption amount, is configured, it is still possible to derive the power consumption amount from the same procedure as the aforementioned procedure, as long as dynamics information on the industrial machine is input from an external unit at Step S2 described above. Also, the same effects can still be achieved. Furthermore, the power-consumption-amount estimation apparatus is not limited to deriving the power consumption amount of a device that executes a positioning control. For example, the power-consumption-amount estimation apparatus can also derive the power consumption amount of an industrial machine that does not execute a positioning control but executes speed control or torque control that can identify the operation pattern.

Second Embodiment

In the first embodiment, a case has been described in which the power-consumption-amount estimation apparatus derives, from a simulation, a power consumption amount of an industrial machine configured to use only a single motor.

However, it is also possible to apply the present invention to the case where a plurality of motors are used in a single industrial machine and are driven by a plurality of amplifiers. In the present embodiment, this example is described. The configuration of the power-consumption-amount estimation apparatus according to the present embodiment is identical to that of the first embodiment.

Figure 6:
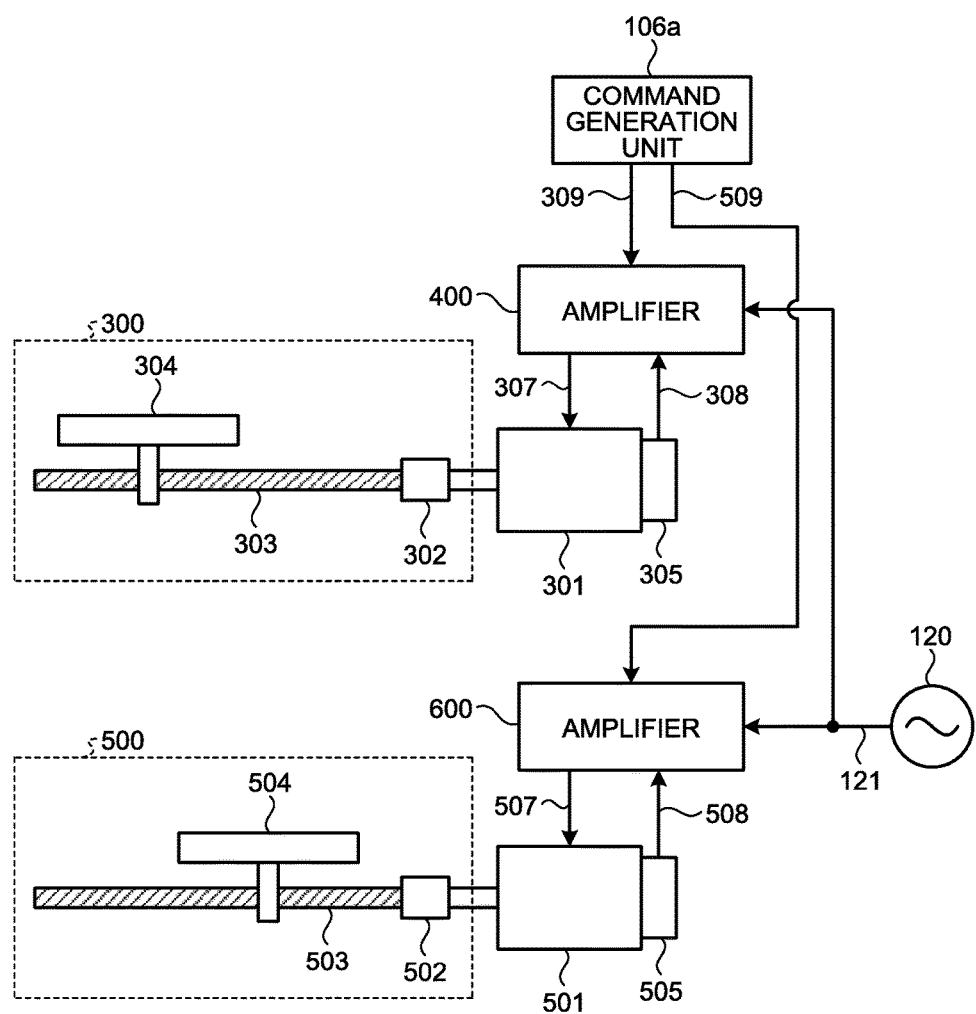
FIG. 6 is a diagram illustrating an example configuration of an industrial machine as a target for a power-consumption-amount estimation apparatus according to a second embodiment to derive a power consumption amount.

FIG. 6 is a diagram illustrating an example configuration of an industrial machine as a target for the power-consumption-amount estimation apparatus according to the second embodiment to derive a power consumption amount from a simulation. In the present embodiment, an example case is described in which the power-consumption-amount estimation apparatus derives a power consumption amount of a target industrial machine configured as illustrated in FIG. 6 from a simulation when this industrial machine performs a positioning operation using a plurality of motors.

The industrial machine illustrated in FIG. 6 includes a plurality of machines that are driven by the motors. Specifically, the industrial machine illustrated in FIG. 6 includes a machine 300, which is configured to include a coupling 302, a ball screw 303, and a table 304; and a machine 500, which is configured to include a coupling 502, a ball screw 503, and a table 504. In both the machines 300 and 500, rotational motion of the motor drives the table through the coupling and the ball screw. Further, the industrial machine includes a motor 301, which drives the machine 300; a motor 501, which drives the machine 500; an amplifier 400, which supplies a current to the motor 301; an amplifier 600, which supplies a current to the motor 501; and a command generation unit 106a, which outputs operation-pattern signals 309 and 509 to the amplifiers 400 and 600, respectively. As described above, the industrial machine illustrated in FIG. 6 is configured to include a plurality of sets, each set including a machine and a motor that drives the machine, as a pair, and an amplifier that drives the motor.

In the industrial machine illustrated in FIG. 6, the command generation unit 106a supplies an operation pattern of the motor 301 or the table 304 as the operation-pattern signal 309 to the amplifier 400, and it also supplies an operation pattern of the motor 501 or the table 504 as the operation-pattern signal 509 to the amplifier 600.

The AC voltage 121 is supplied from the AC power supply 120 to the amplifiers 400 and 600 in the industrial machine illustrated in FIG. 6. The amplifiers 400 and 600 have the same configuration as the amplifier 200 in the industrial machine illustrated in FIG. 3. That is, each of the amplifiers 400 and 600 includes the same constituent elements as those included in the amplifier 200, i.e., the rectifier 201, the smoothing capacitor 202, the regenerative resistor 203, the regenerative transistor 204, the inverter 205, and the servo control unit 220. The amplifiers 400 and 600 operate in the same manner as the amplifier 200. Specifically, the amplifier 400 supplies a current 307 to the motor 301 in such a manner that a detection signal 308 follows the operation-pattern signal 309, where the detection signal 308 indicates a detection result of the rotor position, rotational speed, and the like of the motor 301 and is output from an encoder 305 attached to the motor 301. The amplifier 600 supplies a current 507 to the motor 501 in such a manner that a detection signal 508 follows the operation-pattern signal 509, where the detection signal 508 indicates a detection result of the rotor position, rotational speed, and the like of the motor 501 and is output from an encoder 505 attached to the motor 501.

In the descriptions below, the motor 301 and the motor 501 are sometimes referred to as a "motor #1" and a "motor #2", respectively, for the sake of convenience. Further, the amplifier 400 and the amplifier 600 are sometimes referred to as an "amplifier #1" and an "amplifier #2", respectively. Furthermore, the machine 300 and the machine 500 are sometimes referred to as a "machine #1" and a "machine #2", respectively.

Figure 7:
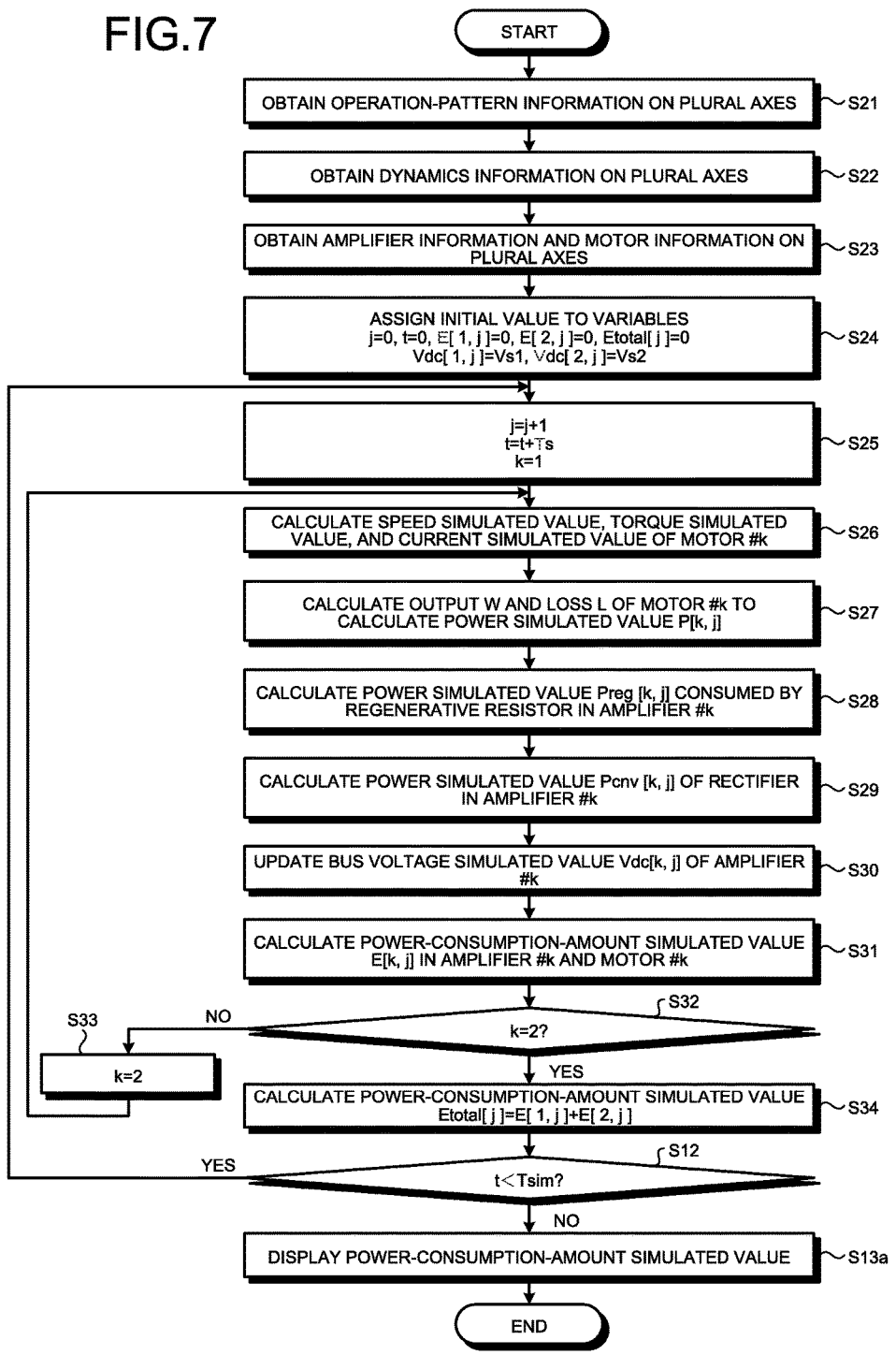
FIG. 7 is a flowchart illustrating an example of a power-consumption-amount estimating operation of the power-consumption-amount estimation apparatus according to the second embodiment.

Next, the process flow through which the power-consumption-amount estimation apparatus according to the present embodiment simulates the power consumption amount of the industrial machine illustrated in FIG. 6 is described with reference to the flowchart illustrated in FIG. 7. FIG. 7 is a flowchart illustrating an example of the power-consumption-amount estimating operation of the power-consumption-amount estimation apparatus according to the second embodiment, i.e., the operation of the power-consumption-amount estimation apparatus to perform a simulation to estimate a power consumption amount of the industrial machine. The flowchart in FIG. 7 has similar points to the flowchart in FIG. 4. Therefore, descriptions of some of the processes illustrated in FIG. 7, which are similar to those illustrated in FIG. 4, are sometimes omitted or simplified. In FIG. 7, the process that is the same as illustrated in FIG. 4 is denoted by the same step numeral as in FIG. 4. Descriptions of the process illustrated in FIG. 7, which is denoted by the same step numeral as in FIG. 4, are omitted.

When the power-consumption-amount estimation apparatus according to the second embodiment estimates a power consumption amount by performing a simulation, first, the power-consumption-amount estimation apparatus obtains, from an external unit, operation-pattern information on a plurality of axes, i.e., operation-pattern information that indicates an operation pattern of each rotary shaft of the motors (Step S21). Specifically, the operation-pattern-information obtaining unit 11 obtains, from an external unit, various types of information regarding each of the motors #1 and #2, such as the amount of movement, speed, acceleration time, and deceleration time during the table-positioning operation, and dwell time, which is a waiting time between the positioning operations. The operation-pattern-information obtaining unit 11 then transmits the obtained information to the power-consumption-amount calculation unit 14 as operation-pattern information. Upon receiving a total of two pieces of operation-pattern information corresponding respectively to the motors #1 and #2 from the operation-pattern-information obtaining unit 11, the power-consumption-amount calculation unit 14 stores therein each piece of the received operation-pattern information.

Figure 8:
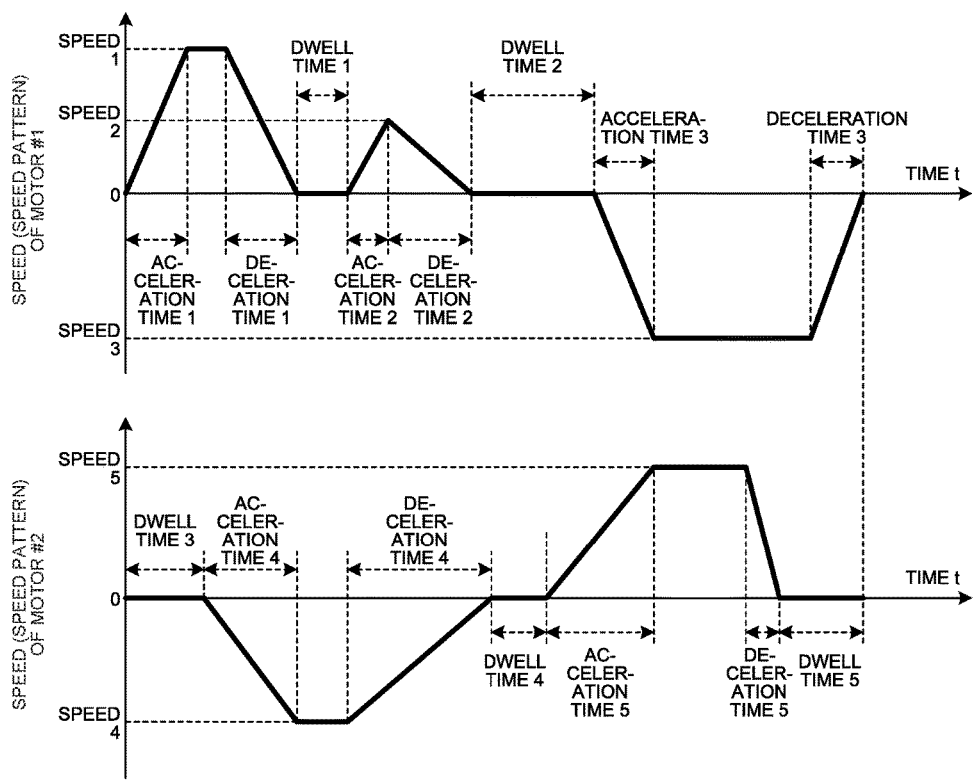
FIG. 8 is a diagram illustrating an example of operation patterns indicated by operation-pattern information obtained by the power-consumption-amount estimation apparatus according to the second embodiment.

Operation patterns indicated by the pieces of operation-pattern information, which respectively correspond to the motors #1 and #2 and are obtained from an external unit by the operation-pattern-information obtaining unit 11, are speed patterns illustrated in FIG. 8, for example. The speed pattern illustrated on the upper side of FIG. 8 corresponds to the motor #1. The speed pattern illustrated on the lower side of FIG. 8 corresponds to the motor #2. The configuration of each speed pattern is the same as the speed pattern illustrated in FIG. 5. Therefore, a detailed description thereof is omitted.

On the basis of the operation-pattern information received from the operation-pattern-information obtaining unit 11, the power-consumption-amount calculation unit 14 can uniquely determine a command signal for each of the motors #1 and #2 to operate. Upon determining a command signal to operate each of the motors #1 and #2, the power-consumption-amount calculation unit 14 can determine a position command $X1^*(t)$ and a speed command $V1^*(t)$ of the motor #1 with respect to time "t", and it can also determine a position command X2*(t) and a speed command V2*(t) of the motor #2 with respect to time "t".

Subsequently, the power-consumption-amount estimation apparatus obtains dynamics information on the axes, i.e., dynamics information attributable to the operation of each rotary shaft of the motors (Step S22). Specifically, the dynamics-information obtaining unit 12 obtains, from an external unit, dynamics information corresponding to the motor #1, which is information that specifies the dynamics of the motor #1 and the machine #1, and it also obtains dynamics information corresponding to the motor #2, which is information that specifies the dynamics of the motor #2 and the machine #2. The dynamics-information obtaining unit 12 then transmits the obtained dynamics information to the power-consumption-amount calculation unit 14. Upon receiving the dynamics information corresponding respectively to the motors from the dynamics-information obtaining unit 12, the power-consumption-amount calculation unit 14 stores therein the received dynamics information. The dynamics information is the same as that described in the first embodiment. The dynamics information corresponding to the motor #1 is moving inertia of the machine #1 attributable to the rotational operation of the motor #1, a friction attributable to the rotational operation of the motor #1, and other information. The dynamics information corresponding to the motor #2 is moving inertia of the machine #2 attributable to the rotational operation of the motor #2, a friction attributable to the rotational operation of the motor #2, and other information. On the basis of the dynamics information, the power-consumption-amount calculation unit 14 can uniquely determine the dynamics such as the equation of motion of the machine #1 and the motor #1 and the dynamics such as the equation of motion of the machine #2 and the motor #2.

Subsequently, the power-consumption-amount estimation apparatus obtains amplifier information and motor information on the axes, i.e., amplifier information on each amplifier, and motor information on each motor (Step S23). Specifically, the circuit-information obtaining unit 13 obtains, from an external unit, information on amplifier-related constants as the amplifier information on each amplifier. More specifically, the amplifier information contains the capacitance value of the smoothing capacitor, the resistance value of the regenerative resistor, the voltage value at which the regenerative transistor is turned on, and the resistance value of the rectifier, where the smoothing capacitor, the regenerative resistor, the regenerative transistor, and the rectifier are constituents of the amplifier #1, as well as the capacitance value of the smoothing capacitor, the resistance value of the regenerative resistor, the voltage value at which the regenerative transistor is turned on, and the resistance value of the rectifier, where the smoothing capacitor, the regenerative resistor, the regenerative transistor, and the rectifier are constituents of the amplifier #2. Simultaneously, the circuit-information obtaining unit 13 obtains, from an external unit, the voltage wave-height value and the power-supply frequency of the AC power supply 120. Further, the circuit-information obtaining unit 13 obtains, from an external unit, the winding resistance value of the motor #1 and the torque constant that shows the magnitude of torque to be generated in the motor #1 per unit current, and it also obtains the winding resistance value of the motor #2 and the torque constant that shows the magnitude of torque to be generated in the motor #2 per unit current, as the motor information on the respective motors. The circuit-information obtaining unit 13 transmits the obtained amplifier information on each amplifier and the obtained motor information on each motor to the power-consumption-amount calculation unit 14. At this time, the circuit-information obtaining unit 13 additionally obtains the sample time Ts, which represents the duration for which the power-consumption-amount estimation apparatus performs a simulation, and then it transmits the obtained sample time Ts to the power-consumption-amount calculation unit 14.

Steps S21 to S23 described above may be performed in the opposite order.

Next, the power-consumption-amount estimation apparatus assigns an initial value to variables to be used in the process of calculating a power consumption amount (Step S24). Specifically, the power-consumption-amount calculation unit 14 sets j=0, t=0, E[1, j]=0, E[2, j]=0, Etotal[j]=0, Vdc[1, j]=Vs1, and Vdc[2, j]=Vs2. The variable "j" represents an array index, and "t" represents time. E[1, j] represents the power-consumption-amount simulated value of the motor #1 and the amplifier #1, calculated by simulation at time t=j·Ts. E[2, j] represents the power-consumption-amount simulated value of the motor #2 and the amplifier #2, calculated by simulation at time t=j·Ts. Vdc[1, j] represents the bus voltage simulated value of the amplifier #1, calculated by simulation at time t=j·Ts. Vdc[2, j] represents the bus voltage simulated value of the amplifier #2, calculated by simulation at time t=j·Ts. Etotal[j] represents the simulated value of the power amount consumed by a plurality of motors, amplifiers, and machines, calculated by simulation at time t=j·Ts, i.e., a simulated value of the power consumption amount of the industrial machine illustrated in FIG. 6.

The power-consumption-amount calculation unit 14 executes Step S24 to initialize the variables, and then increments the index "j" by 1, and also it increases the parameter "t" that represents time by the sample time Ts. That is, the power-consumption-amount calculation unit 14 sets j=j+1 and t=t+Ts. Further, the power-consumption-amount calculation unit 14 sets an index "k" that represents one of a plurality of sets of a motor, an amplifier, and a machine, at k=1 (Step S25). k=1 represents a set of the motor #1, the amplifier #1, and the machine #1. k=2 represents a set of the motor #2, the amplifier #2, and the machine #2.

Steps S26 to S31 are the same processes as Steps S6 to S11 in the flowchart in FIG. 4, which have been described in the first embodiment. That is, at Steps S26 to S31, the power-consumption-amount calculation unit 14 executes the processes at Steps S6 to S11 illustrated in FIG. 4 on a motor #k, an amplifier #k, and a machine #k as a target, to calculate the power-amount simulated value E[k, j], which is the simulated value of the power amount consumed by the amplifier #k and the motor #k at time t=j·Ts.

After calculating E[k, j] at Step S31, the power-consumption-amount calculation unit 14 checks whether k=2 (Step S32). When k≠2 (NO at Step S32), the power-consumption-amount calculation unit 14 sets k=2 (Step S33), and then executes Steps S26 to S31 to calculate E[k, j]. In contrast, when k=2 (YES at Step S32), the power-consumption-amount calculation unit 14 calculates the power-consumption-amount simulated value Etotal[j], which is the simulated value of the power consumption amount of the industrial machine at time t=j·Ts (Step S34). Specifically, the power-consumption-amount calculation unit 14 derives Etotal[j]=E[1, j]+E[2, j].

Subsequently, the power-consumption-amount calculation unit 14 determines whether the parameter "t" that represents time is smaller than the simulation end time Tsim (Step S12). When "t" is smaller than Tsim (YES at Step S12), the process of the power-consumption-amount calculation unit 14 returns to Step S25 to execute again Steps S25 to S34 described above. When "t" is equal to or greater than Tsim (NO at Step S12), the power-consumption-amount calculation unit 14 ends the process of calculating the power-consumption-amount simulated value, i.e., it ends the repetition of Steps S25 to S34 described above. The result output unit 15 displays information on the power-consumption-amount simulated value calculated by the power-consumption-amount calculation unit 14, i.e., Etotal[j], on the display unit (Step S13a). The result output unit 15 displays Etotal[j] by the same method as in the first embodiment.

As described above, according to the flowchart in FIG. 7, the power-consumption-amount estimation apparatus simulates the operation of each of a plurality of sets of a motor, a machine, and an amplifier, which are constituents of the industrial machine, on the basis of its operation pattern and thus calculates a simulated value of the power consumption amount. The power-consumption-amount estimation apparatus outputs the calculated simulated value to an external unit by displaying it on the display unit, or other methods. With this operation, a user of the power-consumption-amount estimation apparatus can recognize the power consumption amount when the machines 300 and 500 and the motors 301 and 501, all of which are constituents of the industrial machine, operate according to a predetermined operation pattern with no time and effort used to actually operate the machines 300 and 500, the motors 301 and 501, and other devices.

A case has been described here, in which there are two sets of a motor, a machine, and an amplifier, all of which are constituents of the industrial machine. However, in the case where there are three or more sets, the power-consumption-amount estimation apparatus is still capable of calculating the simulated value of the power consumption amount according to the same flowchart as that in FIG. 7. In a case where there are three or more sets of a motor, a machine and an amplifier, it is possible that the power-consumption-amount estimation apparatus executes Steps S26 to S31 illustrated in FIG. 7 on each set to calculate the power-consumption-amount simulated value of each set, and at Step S34, sums the power-consumption-amount simulated values of the respective sets to derive the power-consumption-amount simulated value for the entire industrial machine. At Steps S32 and S33, the value of "k" is changed according to the number of sets of a motor, a machine, and an amplifier.

The reasons the power-consumption-amount estimation apparatus can accurately simulate the power consumption amount of the industrial machine configured as illustrated in FIG. 6 by calculating the power-consumption-amount simulated value according to the flowchart in FIG. 7 are described here.

In the industrial machine configured as illustrated in FIG. 6, the amplifier 400 and the amplifier 600 do not supply or receive energy to or from each other. Therefore, regenerative power generated in the motor 301 cannot be used by the motor 501 nor can regenerative power generated in the motor 501 be used by the motor 301. Therefore, regenerative power generated in the motor 301 is stored in the smoothing capacitor within the amplifier 400, or is consumed by the regenerative resistor within the amplifier 400. Similarly, regenerative power generated in the motor 501 is stored in the smoothing capacitor within the amplifier 600 or is consumed by the regenerative resistor within the amplifier 600. Therefore, in a case where the industrial machine is configured to use a plurality of motors and to drive each of the motors by its corresponding amplifier as illustrated in FIG. 6, the power-consumption-amount estimation apparatus combines a motor with an amplifier that drives the motor as a unit to individually calculate the power consumption amount, i.e., to calculate the power consumption amount of each combination of a motor and an amplifier. The power-consumption-amount estimation apparatus then sums the calculated power consumption amounts of the respective combinations of a motor and an amplifier, and therefore can calculate a total power consumption amount of the industrial machine.

In the operation of the power-consumption-amount estimation apparatus according to the flowchart illustrated in FIG. 7, first the power-consumption-amount estimation apparatus sets k=1 and then executes Steps S26 to S31, which are the same processes as Steps S6 to S11 described in the first embodiment, in order to calculate the power-consumption-amount simulated value of the first pair of the motor #1 and the amplifier #1. After calculating the power-consumption-amount simulated value of the first pair, the power-consumption-amount estimation apparatus sets k=2 at Step S33 to execute Steps S26 to S31 again in order to calculate the power-consumption-amount simulated value of the second pair of the motor #2 and the amplifier #2. Thereafter, at Step S34, by summing the power-consumption-amount simulated values of the first and second pairs, the power-consumption-amount estimation apparatus calculates the total power consumption amount of the motors and the amplifiers that drive the corresponding motors, i.e., the power-consumption-amount simulated value Etotal[j], which is the simulated value of the total power consumption amount of the industrial machine. As described above, the power-consumption-amount estimation apparatus can calculate the power consumption amount when each of a plurality of sets of a motor, an amplifier, and a machine operates according to its individual operation pattern.

Third Embodiment

In the second embodiment, a case has been described, in which the power-consumption-amount estimation apparatus derives, from a simulation, the power consumption amount of an industrial machine that is configured to include a plurality of motors and amplifiers equivalent in number to the motors. However, in a third embodiment, a case is described in which the power-consumption-amount estimation apparatus derives, from a simulation, the power consumption amount of an industrial machine that is configured to drive a plurality of motors by a single amplifier. The configuration of the power-consumption-amount estimation apparatus according to the present embodiment is identical to that of the first embodiment.

Figure 9:
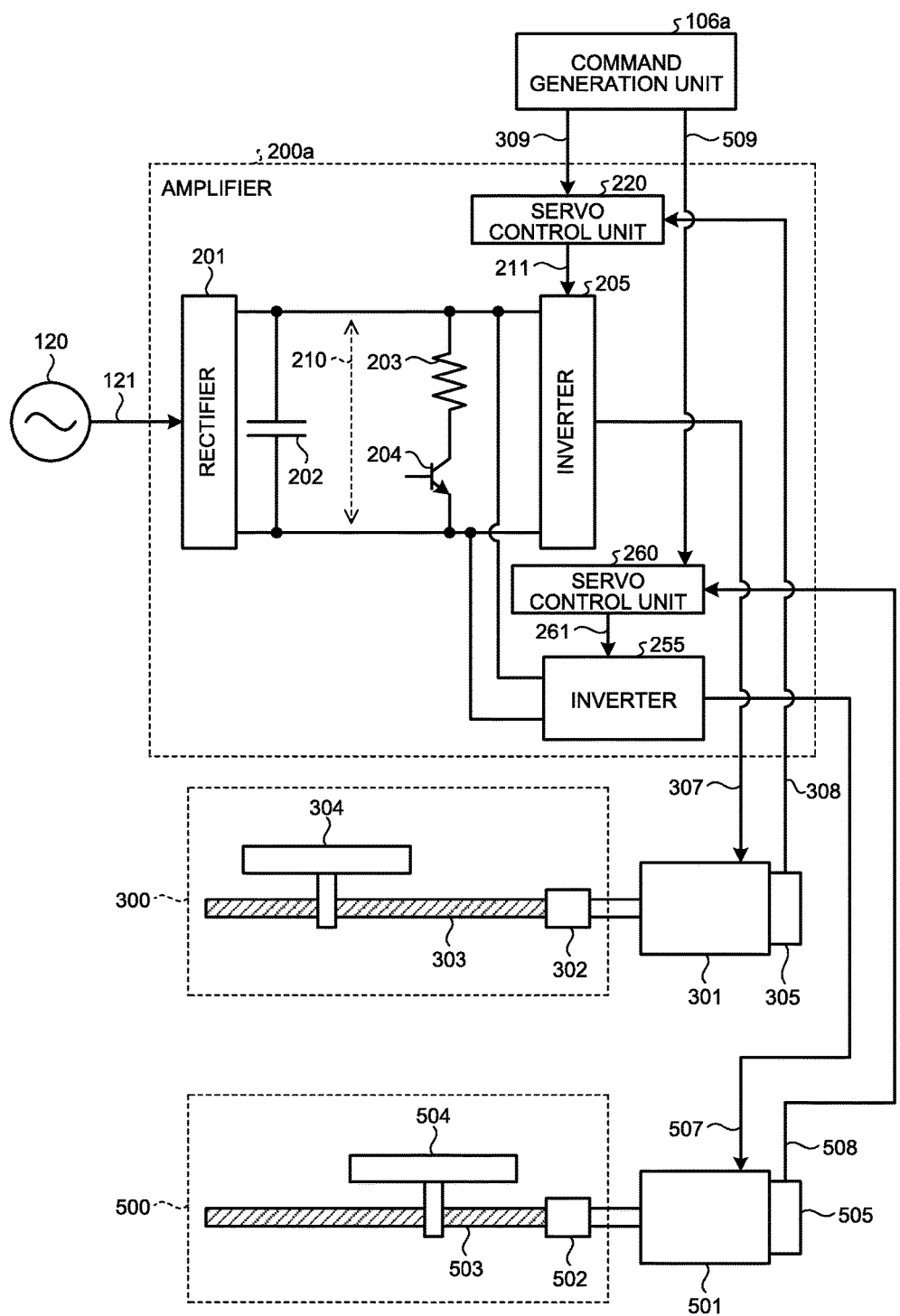
FIG. 9 is a diagram illustrating an example configuration of an industrial machine as a target for a power-consumption-amount estimation apparatus according to a third embodiment to derive a power consumption amount.

FIG. 9 is a diagram illustrating an example configuration of an industrial machine as a target for the power-consumption-amount estimation apparatus according to the third embodiment to derive the power consumption amount from a simulation. In the present embodiment, an example case is described in which the power-consumption-amount estimation apparatus derives the power consumption amount of a target industrial machine configured as illustrated in FIG. 9 from a simulation when the industrial machine performs a positioning operation using a plurality of motors.

The industrial machine illustrated in FIG. 9 includes a plurality of machines that are driven by the motors. Specifically, the industrial machine illustrated in FIG. 9 includes the machine 300, which is configured to include the coupling 302, the ball screw 303, and the table 304; and the machine 500, which is configured to include the coupling 502, the ball screw 503, and the table 504 in the same manner as the industrial machine illustrated in FIG. 6. In both the machines 300 and 500, rotational motion of the motor drives the table through the coupling and the ball screw. Further, the industrial machine includes the motor 301, which drives the machine 300; the motor 501, which drives the machine 500; an amplifier 200a, which supplies a current to the motors 301 and 501; and the command generation unit 106a, which outputs the operation-pattern signals 309 and 509 to the amplifier 200a. As described above, the industrial machine illustrated in FIG. 9 includes a plurality of pairs of a machine and a motor that drives the machine, in which the motors in the respective pairs are driven by a single amplifier.

In the industrial machine illustrated in FIG. 9, the command generation unit 106a supplies an operation pattern of the motor 301 and the table 304 as the operation-pattern signal 309 to the amplifier 200a and it also supplies an operation pattern of the motor 501 and the table 504 as the operation-pattern signal 509 to the amplifier 200a.

The industrial machine illustrated in FIG. 9 is equivalent to the industrial machine illustrated in FIG. 6 in which the amplifier 200a is provided in place of the amplifiers 400 and 600. The amplifier 200a is equivalent to the amplifier 200 in the industrial machine illustrated in FIG. 3 in which a servo control unit 260 and an inverter 255 are additionally provided. The servo control unit 260 performs the same operation as the servo control unit 220. That is, the servo control unit 260 executes a feedback control in such a manner that the detection signal 508 input from the encoder 505 follows the operation-pattern signal 509 input from the command generation unit 106a, in order to calculate a voltage command 261. The inverter 255 performs the same operation as the inverter 205. That is, the inverter 255 supplies the current 507 to the motor 501 by performing PWM computation and the like on the bus voltage 210 and converting the power in such a manner that the voltage command 261 is applied to the motor 501.

In the descriptions below, the motor 301 and the motor 501 are sometimes referred to as the "motor #1" and the "motor #2", respectively, for the sake of convenience. Further, the machine 300 and the machine 500 are sometimes referred to as the "machine #1" and the "machine #2", respectively.

Figure 10:
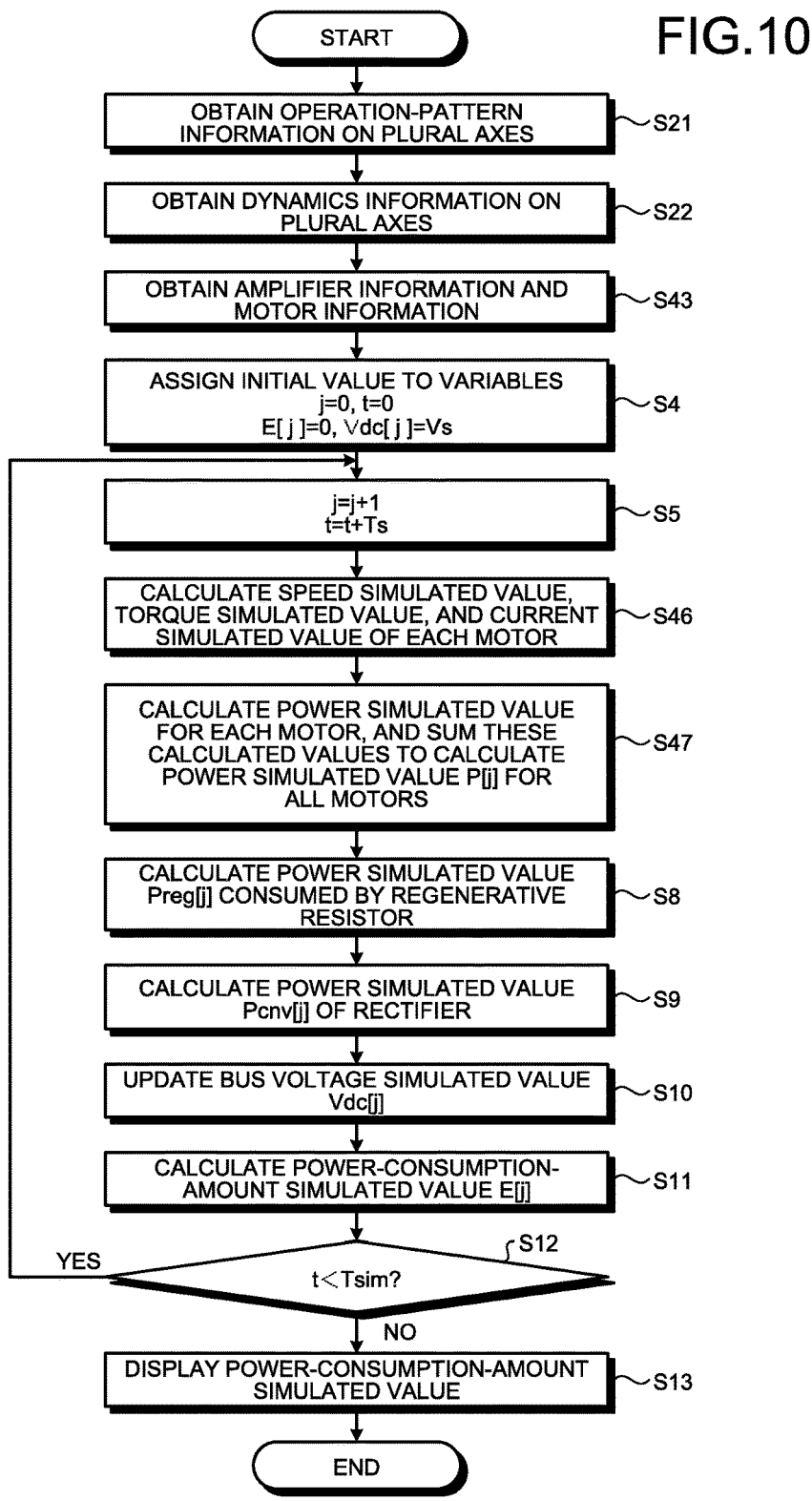
FIG. 10 is a flowchart illustrating an example of a power-consumption-amount estimating operation of the power-consumption-amount estimation apparatus according to the third embodiment.

Next, the process flow through which the power-consumption-amount estimation apparatus according to the present embodiment simulates the power consumption amount of the industrial machine illustrated in FIG. 9 is described with reference to the flowchart illustrated in FIG. 10. FIG. 10 is a flowchart illustrating an example of the power-consumption-amount estimating operation of the power-consumption-amount estimation apparatus according to the third embodiment, i.e., the operation of the power-consumption-amount estimation apparatus to perform a simulation to estimate the power consumption amount of the industrial machine. The flowchart in FIG. 10 has similar points to the flowchart in FIG. 4 or FIG. 7. Therefore, descriptions of some of the processes illustrated in FIG. 10, which are similar to those illustrated in FIG. 4 or FIG. 7, are sometimes omitted or simplified. In FIG. 10, the same processes as those illustrated in FIG. 4 or FIG. 7 are denoted by the same step numerals as those in FIG. 4 or FIG. 7. Descriptions of some of the processes illustrated in FIG. 10, which are denoted by the same step numerals as those in FIG. 4 or FIG. 7, are omitted.

After executing Steps S21 and S22, the power-consumption-amount estimation apparatus according to the third embodiment obtains amplifier information and motor information (Step S43). Specifically, the circuit-information obtaining unit 13 obtains, from an external unit, the capacitance value C of the smoothing capacitor 202, the resistance value Rreg of the regenerative resistor 203, the voltage value Von at which the regenerative transistor 204 is turned on, and the resistance value Rcnv of the rectifier 201, where the smoothing capacitor 202, the regenerative resistor 203, the regenerative transistor 204, and the rectifier 201 are constituents of the amplifier 200a, as the amplifier information, as well as the voltage wave-height value Vs and the power-supply frequency "ω" of the AC power supply 120. Further, as the motor information, the circuit-information obtaining unit 13 obtains, from an external unit, a winding resistance value R1 of the motor #1 and a torque constant Kt1, which shows the magnitude of torque to be generated in the motor #1 per unit current, and it also obtains a winding resistance value R2 of the motor #2 and a torque constant Kt2, which shows the magnitude of torque to be generated in the motor #2 per unit current. The circuit-information obtaining unit 13 transmits the obtained amplifier information and motor information to the power-consumption-amount calculation unit 14. At this time, the circuit-information obtaining unit 13 additionally obtains the sample time Ts, which represents the duration for which the power-consumption-amount estimation apparatus performs a simulation, and then it transmits the obtained sample time Ts to the power-consumption-amount calculation unit 14.

Subsequently to Step S43, the power-consumption-amount estimation apparatus executes Steps S4 and S5, and then it uses each type of information obtained at Steps S21, S22, and S43 to calculate the speed simulated value, the torque simulated value, and the current simulated value of each motor at time "t" (Step S46). Specifically, the power-consumption-amount calculation unit 14 calculates a speed simulated value V1, a torque simulated value τ1, and a current simulated value I1 of the motor #1 at time "t", and also calculates a speed simulated value V2, a torque simulated value τ2, and a current simulated value I2 of the motor #2 at time "t".

That is, when the operation-pattern information obtained at Step S21 indicates a speed command pattern, the power-consumption-amount calculation unit 14 sets the speed simulated value V1 of the motor #1 at time "t" as V1=V1*(t), and the speed simulated value V2 of the motor #2 at time "t" as V2=V2*(t). In addition, the power-consumption-amount calculation unit 14 differentiates the speed commands V1*(t) and V2*(t), respectively, to calculate an acceleration simulated value A1 of the motor #1 and an acceleration simulated value A2 of the motor #2 at time "t". When the operation-pattern information obtained at Step S21 indicates a position command pattern, the power-consumption-amount calculation unit 14 differentiates the position commands X1*(t) and X2*(t), respectively, to calculate the speed simulated value V1 of the motor #1 and the speed simulated values V2 of the motor #2 at time "t", and further it differentiates the calculated speed simulated values V1 and V2, respectively, to calculate the acceleration simulated value A1 of the motor #1 and the acceleration simulated value A2 of the motor #2 at time "t".

After calculating the speed simulated values V1 and V2 and the acceleration simulated values A1 and A2 of the respective motors at time "t", the power-consumption-amount calculation unit 14 further uses the dynamics information attributable to the operation of each rotary shaft of the motors, obtained at Step S22, the speed simulated values V1 and V2, and the acceleration simulated values A1 and A2 to calculate the torque simulated value τ1 of the motor #1 and the torque simulated value τ2 of the motor #2 at time "t". The power-consumption-amount calculation unit 14 calculates the torque simulated values τ1 and τ2 by the same method used to calculate the torque simulated value "τ" at Step S6 described in the first embodiment. Further, the power-consumption-amount calculation unit 14 divides the torque simulated value τ1 by the torque constant Kt1 to calculate the current simulated value I1 of the motor #1 at time "t", and it also divides the torque simulated value τ2 by the torque constant Kt2 to calculate the current simulated value I2 of the motor #2 at time "t".

Next, the power-consumption-amount calculation unit 14 calculates the power simulated value for each motor at time "t", and then it sums the calculated power simulated values to calculate the power simulated value P[j] for all the motors included in the industrial machine (Step S47). Specifically, the power-consumption-amount calculation unit 14 first uses the speed simulated values V1 and V2 and the torque simulated values τ1 and τ2 of the respective motors, which are calculated at Step S46 described above, to calculate the output W1 of the motor #1 and the output W2 of the motor #2 at time "t" according to the following equation (15).

[Equation 15]

$$W1 = V1 \cdot \tau 1$$

$$W2 = V2 \cdot \tau 2 \quad (15)$$

Further, the power-consumption-amount calculation unit 14 uses the current simulated values I1 and I2 of the respective motors, calculated at Step S46 described above, and uses the winding resistance values R1 and R2 of the respective motors, obtained at Step S43 described above, to calculate a loss L1 of the motor #1 and a loss L2 of the motor #2 at time "t" according to the following equation (16).

[Equation 16]

$$L1 = R1 \cdot I1^2$$

$$L2 = R2 \cdot I2^2 \quad (16)$$

Next, the power-consumption-amount calculation unit 14 uses the outputs W1 and W2 and the losses L1 and L2 of the respective motors to calculate a power simulated value P1[j] for the motor #1 and a power simulated value P2[j] for the motor #2 at time "t" according to the following equation (17).

[Equation 17]

$$P1[j] = W1 + L1$$

$$P2[j] = W2 + L2 \quad (17)$$

Subsequently, the power-consumption-amount calculation unit 14 calculates the sum value of the power simulated values for the respective motors at time "t" to calculate the power simulated value P[j] for all the motors included in the industrial machine, as illustrated by the following equation (18).

[Equation 18]

$$P[j] = P1[j] - P2[j] \quad (18)$$

After calculating the power simulated value P[j], the power-consumption-amount calculation unit 14 executes Steps S8 to S11 described in the first embodiment to calculate the power-consumption-amount simulated value E[j]. When the power-consumption-amount calculation unit 14 finishes the calculation of the power-consumption-amount simulated value E[j] over the period from t=0 to Tsim, the result output unit 15 displays the calculated power-consumption-amount simulated value E[j] at Step S13.

As described above, the power-consumption-amount estimation apparatus according to the present embodiment calculates a simulated value of the power for each of the motors, and it sums the simulated values of the power of the motors in order to calculate a simulated value of the power for all the motors included in the industrial machine. Further, the power-consumption-amount estimation apparatus calculates a simulated value of the power for the amplifier by using the same procedure as in the first embodiment, and it integrates the result of the addition of the power simulated value for all the motors and the power simulated value for the amplifier in order to derive an estimated value of the power consumption amount of the entire industrial machine.

Next, the reasons the power-consumption-amount estimation apparatus can accurately simulate the power consumption amount of the industrial machine configured as illustrated in FIG. 9 by calculating the power-consumption-amount simulated value according to the flowchart in FIG. 10 are described here.

In the industrial machine configured as illustrated in FIG. 9, the inverters 205 and 255 within the amplifier 200a are supplied with energy from a common busbar and power is supplied to the motors 301 and 501, respectively. Therefore, it is possible for the motor 501 to use regenerative power generated in the motor 301, and also it is possible for the motor 301 to use regenerative power generated in the motor 501. Accordingly, this needs to be taken into consideration for the calculation of a simulated value of the power consumption amount. Whether the bus voltage 210 in the amplifier 200a is increased or reduced is not determined solely on the basis of the power of each motor, but it is affected by the sum value of the power of the respective motors. As illustrated in FIG. 9, there is a case where the industrial machine is configured to individually drive two motors by using a single amplifier. In that case, when one of the motors performs a regenerative operation while the other motor performs a powering operation, i.e., when the power of one of the motors becomes negative while the power of the other motor becomes positive, then the regenerative power of the motor performing a regenerative operation can be used as energy for the motor performing a powering operation.

At Step S47 in the flowchart illustrated in FIG. 10, the power-consumption-amount calculation unit 14 calculates the power simulated values P1[j] and P2[j] for the respective motors, to calculate the sum of these simulated values as the power simulated value P[j] for all the motors in the manner as described above. With this operation, when one motor performs a powering operation while another motor performs a regenerative operation, then the power simulated value for all the motors is calculated in such a manner that these operations cancel each other out. Therefore, the power-consumption-amount estimation apparatus can accurately simulate the power of all the motors.

In a case where the industrial machine configured as illustrated in FIG. 9 actually operates, when the sum of the amounts of powering energy and regenerative energy in the motors is positive, this indicates that the motors use energy as a whole. Therefore, the amount of energy to be stored in the smoothing capacitor 202 decreases. As a result of this, the bus voltage 210 varies such that it exhibits a decreasing trend. In contrast, when the sum of the amounts of powering energy and regenerative energy in the motors is negative, this indicates that the motors generate energy. Therefore, the amount of energy stored in the smoothing capacitor 202 is increased. As a result of this, the bus voltage 210 varies such that it exhibits an increasing trend. At Step S10 in the flowchart illustrated in FIG. 10, when the power simulated value P[j] for all the motors is positive, then the bus voltage simulated value Vdc[j] is calculated so as to decrease. In contrast, when P[j] is negative, Vdc[j] increases. Therefore, the state described above can be accurately simulated.

In the amplifier 200a illustrated in FIG. 9, when the bus voltage 210 exceeds the ON-voltage Von of the regenerative transistor 204, the regenerative transistor 204 is energized, and therefore the regenerative resistor 203 consumes a portion of the energy stored in the smoothing capacitor 202. At Step S8 in the flowchart illustrated in FIG. 10, when the bus voltage simulated value Vdc[j] exceeds Von, the power-consumption-amount estimation apparatus calculates the power Preg[j] consumed by the regenerative resistor 203. Accordingly, the power-consumption-amount estimation apparatus can accurately simulate a phenomenon in which Preg[j] calculated at Step S8 becomes positive, the bus voltage simulated value Vdc[j] varies such that it exhibits a decreasing trend, and the energy to be stored in the smoothing capacitor 202 decreases.

In the amplifier 200a illustrated in FIG. 9, when the bus voltage 210 becomes lower than the output voltage Vcnv of the rectifier 201, power is supplied from the rectifier 201. At Step S9 in the flowchart in FIG. 10, when the bus voltage simulated value Vdc[j] becomes lower than the output voltage Vcnv of the rectifier 201, the power simulated value Pcnv[j] of the rectifier 201 is calculated as a positive value. Further, the power-consumption-amount estimation apparatus accurately simulates a phenomenon in which, when Pcnv[j] becomes a positive value, the bus voltage simulated value Vdc[j] is increased in the positive direction at Step S10, and furthermore accurately simulates a phenomenon in which the energy to be stored in the smoothing capacitor 202 is increased.

By accurately simulating these phenomena and integrating the power simulated value Pcnv[j] of the rectifier 201 at Step S11 in the flowchart in FIG. 10, the power-consumption-amount estimation apparatus can accurately calculate a power consumption amount when the industrial machine configured as illustrated in FIG. 9 actually operates.

FIG. 9 illustrates an example in which there are two motors, each of which drives a machine, and these two motors are driven by an amplifier that includes a plurality of inverters having a common bus voltage. However, the industrial machine is not limited to this configuration. The power-consumption-amount estimation apparatus is capable of calculating, by using the same procedure as that described in the present embodiment, the simulated value of the power consumption amount of an amplifier that is configured to include three or more inverters that have a common bus voltage and each of which drives a different motor. In this case, the power-consumption-amount estimation apparatus obtains, at Step S21, operation-pattern information that indicates the operation pattern of each of the motors to be used, then obtains dynamics information related to the respective motors at Step S22, and then obtains motor information on the respective motors and amplifier information at Step S43. At Step S47, the power-consumption-amount estimation apparatus calculates the power of each of the motors, and it sums the calculated power to derive the power simulated value P[j] for all the motors.

Fourth Embodiment

In the first to third embodiments, an invention has been described that simulates and calculates the power consumption amount when the motor and the amplifier for driving a machine operate in a designated operation pattern without actually operating the machine and the motor. According to the present invention, it is also possible to calculate the power consumption amount when the industrial machine operates not only in a single operation pattern but also in different operation patterns while using an identical machine, an identical motor, and an identical amplifier, and to compare the differences in power consumption amount between the different operation patterns. In the present embodiment, this example is described. In the present embodiment, an example is described in which the power-consumption-amount estimation apparatus derives a power consumption amount from a simulation when the industrial machine configured as illustrated in FIG. 3 is operated in different operation patterns. The configuration of the power-consumption-amount estimation apparatus according to the present embodiment is identical to that of the first embodiment.

Figure 11:
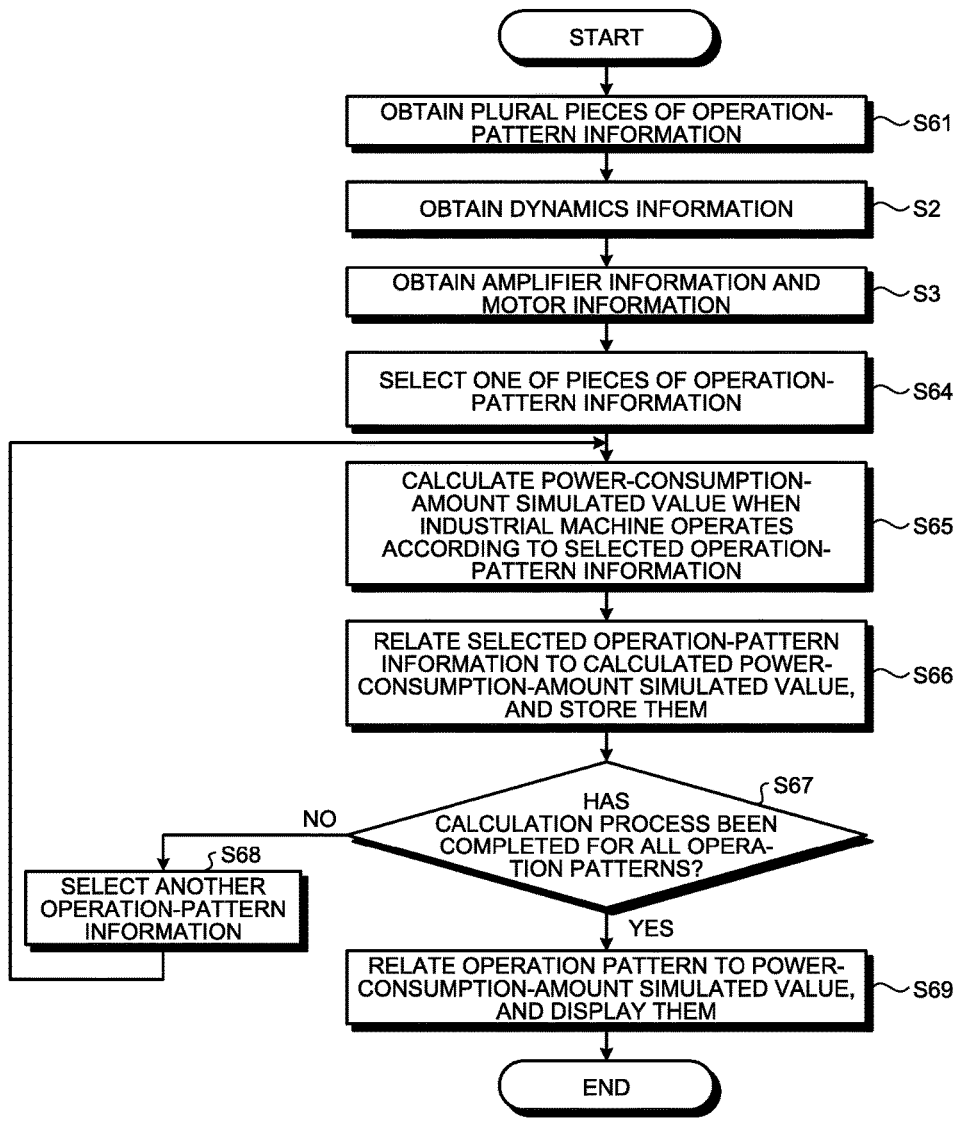
FIG. 11 is a flowchart illustrating an example of a power-consumption-amount estimating operation of a power-consumption-amount estimation apparatus according to a fourth embodiment.

FIG. 11 is a flowchart illustrating an operation example of the power-consumption-amount estimation apparatus according to the fourth embodiment. In FIG. 11, the same processes as those illustrated in FIG. 4 are denoted by the same step numerals as those in FIG. 4. Descriptions of some of the processes illustrated in FIG. 11, which are denoted by the same step numerals as those in FIG. 4, are omitted.

First, the power-consumption-amount estimation apparatus obtains a plurality of pieces of operation-pattern information from an external unit (Step S61). Specifically, the operation-pattern-information obtaining unit 11 obtains and transmits a plurality of pieces of information on different operation patterns to the power-consumption-amount calculation unit 14.

Figure 12:
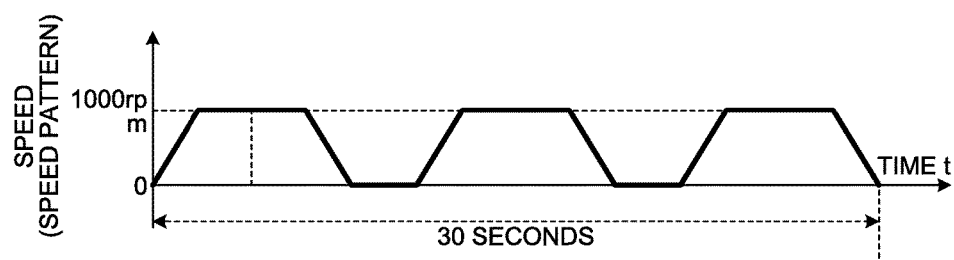
FIG. 12 is a diagram illustrating an example of an operation pattern indicated by operation-pattern information obtained by the power-consumption-amount estimation apparatus according to the fourth embodiment.
Figure 13:
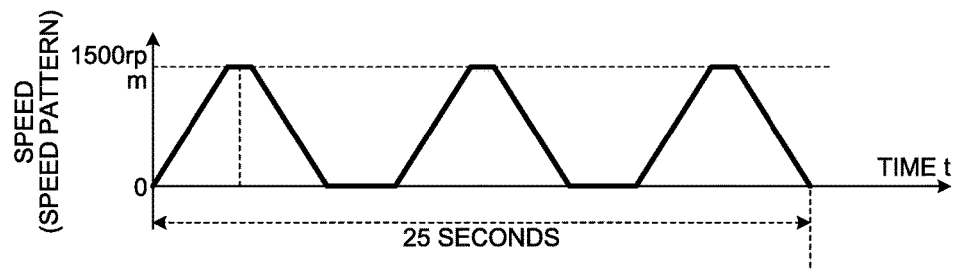
FIG. 13 is a diagram illustrating an example of an operation pattern indicated by operation-pattern information obtained by the power-consumption-amount estimation apparatus according to the fourth embodiment.
Figure 14:
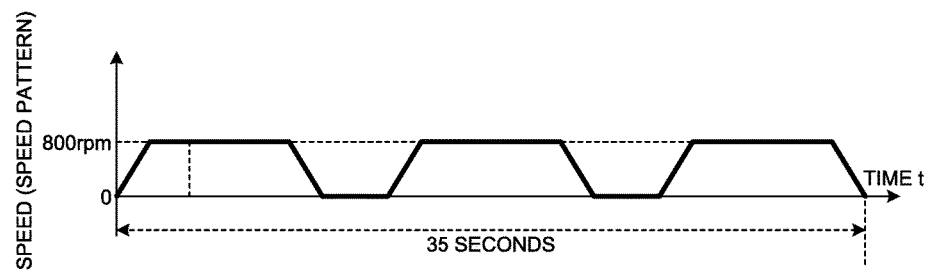
FIG. 14 is a diagram illustrating an example of an operation pattern indicated by operation-pattern information obtained by the power-consumption-amount estimation apparatus according to the fourth embodiment.

At Step S61, the operation-pattern-information obtaining unit 11 obtains, for example, three pieces of operation-pattern information, each of which indicates an operation pattern illustrated in FIG. 12, 13, or 14. Each of the operation patterns illustrated in FIGS. 12 to 14 is formed of three positioning operations and dwell time, which is a waiting time between them. The first positioning operation in the operation pattern in FIG. 12, the first positioning operation in the operation pattern in FIG. 13, and the first positioning operation in the operation pattern in FIG. 14 are equal in their amounts of movement. Similarly, the second positioning operations in the respective operation patterns in FIGS. 12 to 14 are equal in their amounts of movement. The third positioning operations in the respective operation patterns in FIGS. 12 to 14 are equal in their amounts of movement. Further, the length of the dwell time, which is a waiting time between the positioning operations, is identical among the operation patterns in FIGS. 12 to 14. However, only the speed during the positioning operation differs between the operation patterns in FIGS. 12 to 14. FIG. 12 illustrates an operation pattern with a motor speed of 1000 rpm. FIG. 13 illustrates an operation pattern with a motor speed of 1500 rpm. FIG. 14 illustrates an operation pattern with a motor speed of 800 rpm. The operation speed differs between the operation patterns. Therefore, as the speed becomes higher during the positioning-operation time, the positioning time for the positioning operation becomes shorter, and accordingly a series of the operation pattern is finished in a shorter time. In the operation patterns in FIGS. 12 to 14, the operation completion time that is the time required to complete a series of operations including three positioning operations and two waiting operations, is 30 seconds, 25 seconds, and 35 seconds, respectively.

Given that the operation pattern in FIG. 12 is regarded as a conveying-operation pattern of a certain machine, the operation pattern in FIG. 13 can be regarded as a conveying-operation pattern with the amount of conveyance movement identical to the operation pattern in FIG. 12 and with a speed higher than the operation pattern in FIG. 12. Similarly, the operation pattern in FIG. 14 can be regarded as a conveying-operation pattern with the amount of conveyance movement identical to the operation pattern in FIG. 12 and with a speed lower than the operation pattern in FIG. 12.

At Steps S2 and S3 subsequent to Step S61, the power-consumption-amount estimation apparatus obtains the dynamics information, the amplifier information, and the motor information as described in the first embodiment.

Next, the power-consumption-amount estimation apparatus selects one of the pieces of operation-pattern information obtained at Step S61 (Step S64). The processes at Step S64 and at Steps S65 to S68, described later, are executed by the power-consumption-amount calculation unit 14. At Step S64, the power-consumption-amount calculation unit 14 selects, for example, the operation-pattern information that indicates the operation pattern in FIG. 12.

Subsequently, the power-consumption-amount calculation unit 14 calculates the power-consumption-amount simulated value when the industrial machine operates according to the operation-pattern information selected at Step S64 (Step S65). The power-consumption-amount calculation unit 14 executes the same processes as Steps S4 to S12 described in the first embodiment to calculate the power-consumption-amount simulated value.

Next, the power-consumption-amount calculation unit 14 relates the operation-pattern information selected at Step S64 to the power-consumption-amount simulated value calculated at Step S65, and stores them (Step S66). For example, the power-consumption-amount calculation unit 14 relates the operation speed and the operation completion time to the calculated power-consumption-amount simulated value, and stores them.

Figure 15:
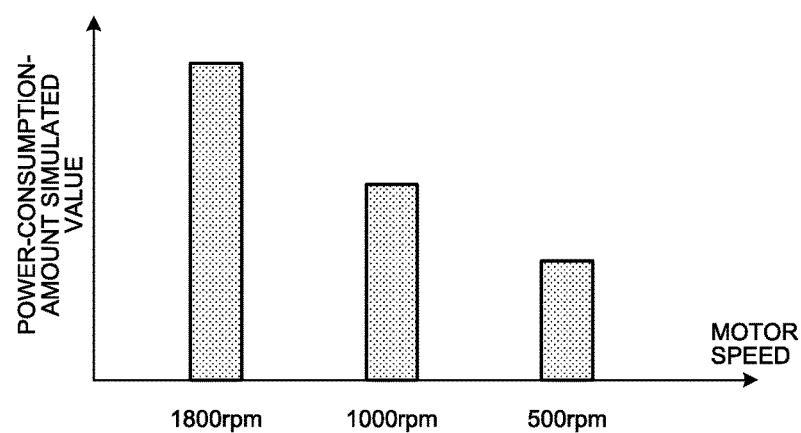
FIG. 15 is a diagram illustrating an example of an estimation result of a power consumption amount of the power-consumption-amount estimation apparatus according to the fourth embodiment.
Figure 16:
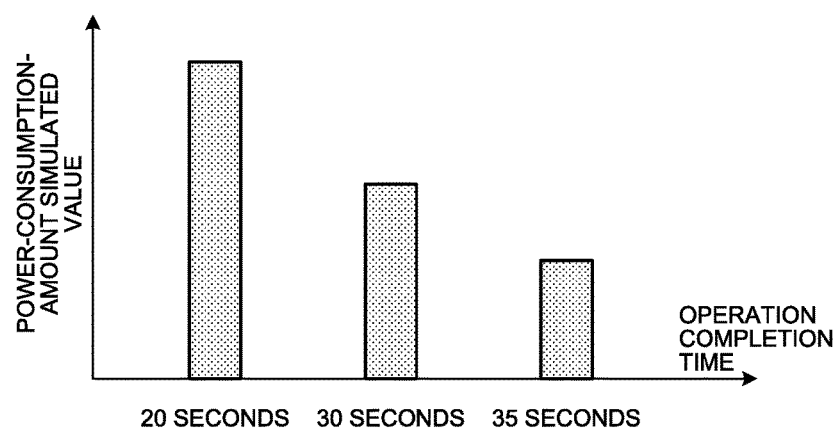
FIG. 16 is a diagram illustrating an example of an estimation result of a power consumption amount of the power-consumption-amount estimation apparatus according to the fourth embodiment.

Subsequently, the power-consumption-amount calculation unit 14 checks whether calculation of the power-consumption-amount simulated value has been completed for all the operation patterns indicated by the pieces of operation-pattern information obtained at Step S61 (Step S67). When calculation of the simulated value has not yet been completed (NO at Step S67), the power-consumption-amount calculation unit 14 selects another operation-pattern information, i.e., one of the pieces of operation-pattern information, which indicates an operation pattern for which calculation of the power-consumption-amount simulated value has not yet been completed (Step S68), and then it executes Steps S65 and S66. In contrast, when calculation of the power-consumption-amount simulated value has been completed for all the operation patterns (YES at Step S67), the power-consumption-amount calculation unit 14 reads and outputs the operation-pattern information and the power-consumption-amount simulated values, which have been stored at Step S66, to the result output unit 15. The result output unit 15 then displays the operation patterns indicated by the operation-pattern information and the power-consumption-amount simulated values, which have been received from the power-consumption-amount calculation unit 14, on the display unit (Step S69). At Step S69, the result output unit 15 displays the specifics illustrated in FIG. 15 or FIG. 16. However, the specifics to be displayed are not limited thereto. FIG. 15 is a display example illustrating a motor operation speed on the horizontal axis and the power-consumption-amount simulated value on the vertical axis. FIG. 15 illustrates the relation between the motor operation speed and the power-consumption-amount simulated value. FIG. 16 is a display example illustrating the operation completion time on the horizontal axis and the power-consumption-amount simulated value on the vertical axis. FIG. 16 illustrates the relation between the operation completion time and the power-consumption-amount simulated value.

The effects obtained in the present embodiment are described here. Also in the present embodiment, the power-consumption-amount estimation apparatus calculates the power-consumption-amount simulated value through the same procedure as in the first to third embodiments. Therefore, the power-consumption-amount estimation apparatus can accurately calculate the power consumption amounts for a plurality of operation patterns without actually operating the machine and the motor.

Generally, as the operation completion time is reduced, for example, by increasing the speed of the operation pattern, the hourly productivity is improved when the industrial machine is used as a production facility for industrial products. In contrast, as the operation time is reduced, for example, by increasing the motor speed, the power consumption amount consumed by the motor and the amplifier tends to increase. In other words, there is a trade-off relation between the machine operation time and the power consumption amount. According to the present embodiment, the power-consumption-amount estimation apparatus sets a plurality of operation-pattern conditions, calculates the power-consumption-amount simulated value for each of the conditions, and relates the calculated power-consumption-amount simulated values to the pieces of operation-pattern information in order to display them as illustrated in FIGS. 15 and 16. With this operation, a user of the power-consumption-amount estimation apparatus can easily recognize the trade-off relation between the power consumption amount and the operation pattern with no time and effort used to actually operate the machine and the motor.

In the case where the power-consumption-amount estimation apparatus relates the operation completion time to the power-consumption-amount simulated value and then displays them, as illustrated in FIG. 16, a user of the power-consumption-amount estimation apparatus can visually recognize the trade-off relation between the production time and the electricity cost. With this operation, a user of the power-consumption-amount estimation apparatus can determine the optimal machine operation time, taking into account the trade-off relation between the production time and the electricity cost.

In the present embodiment, the conditions where the positioning-operation speed is changed have been described as an example. However, the conditions are not limited thereto. Any conditions are applicable as long as the operation patterns are different from each other. For example, the present embodiment can also be applied to operation patterns with different accelerations or different acceleration-deceleration times during the positioning operation instead of different positioning-operation velocities, and the same effects can still be obtained.

Further, it is possible that not only numerical values of the speed, the acceleration, or other factors are prepared but also a plurality of operational shapes of the positioning operation are prepared to simulate the differences in power consumption amount between the operational shapes. For example, it is possible that a linear acceleration-deceleration pattern, which has a trapezoidal speed pattern, and an S-shaped acceleration-deceleration pattern, in which acceleration and deceleration are performed in an S-shape without linear acceleration and deceleration, are applied as a plurality of operational conditions. In this case, it is common that the S-shaped acceleration and deceleration is less likely to generate a shock or vibration when compared to the trapezoidal command to perform linear acceleration and deceleration. However, given that an industrial machine is operated by an identical amount of movement within an identical positioning time by using each of the linear acceleration-deceleration pattern and the S-shaped acceleration-deceleration pattern, the S-shaped acceleration-deceleration pattern tends to show a greater peak acceleration and a greater power consumption amount. When a user determines whether a positioning operation in a certain operation pattern is performed by using either the linear acceleration-deceleration pattern or the S-shaped acceleration-deceleration pattern, the power-consumption-amount estimation apparatus simulates the power consumption amount when the industrial machine is operated by using each of the patterns, and it relates the simulated power consumption amount to each of the patterns in order to display them. Therefore the power-consumption-amount estimation apparatus can provide a user with the criteria for selecting a command shape while taking into account the trade-off between the degree of reduction in vibration or shock and the power-consumption-amount reduction effect.

Further, in the present embodiment, a case has been described in which the industrial machine illustrated in FIG. 3 uses only a single motor. However, the present embodiment can also be applied to an industrial machine configured to use a plurality of motors. The power-consumption-amount estimation apparatus sets a plurality of operation patterns for each of the motors, then simulates and calculates the power consumption amount for each of the operation patterns, and relates the calculated power-consumption-amount simulated values to the set operation patterns, such as speed, acceleration, acceleration-deceleration time, and a command shape of the positioning operation, in order to display them. With this operation, a user can recognize the relation between the set operation patterns and the power consumption amounts without actually operating the machines and the motors, and further a user can select an appropriate operation pattern by taking into account the relation between the set operation patterns and the power consumption amounts.

In the present embodiment, a description has been given of a case where individual power consumption amounts when the machine is operated by a single motor and a single amplifier by using a plurality of operation patterns are simulated and the operation patterns are related to the simulation values of the power consumption amount in order to display them. Relating the operation patterns to their corresponding power-consumption-amount simulation values as described above is not limited to the case where the machine is operated by a single motor and a single amplifier. The present embodiment can also be applied to a case where a plurality of motors are operated by a plurality of amplifiers or where a plurality of motors are operated by a single amplifier with a common busbar as described in the second and third embodiments. In this case, it is possible that the power-consumption-amount estimation apparatus prepares a plurality of sets of operation patterns for the motors, then simulates the power consumption amount when the machine is operated according to the individual sets of operation patterns, and thereafter relates the individual sets of operation patterns to their corresponding power-consumption-amount simulation values in order to display them.

Fifth Embodiment

In the fourth embodiment, an example has been described in which the power-consumption-amount estimation apparatus simulates the power consumption amount individually for a plurality of operation patterns, and then it displays the differences in power consumption amount between the operation patterns. However, a user can also recognize the differences in power consumption amount not only when the operation pattern is changed but also when the configuration of the amplifier or the motor that drives the machine is changed. In a fifth embodiment, an example is described in which the power-consumption-amount estimation apparatus simulates how the power consumption amount varies when different types of motors are used in the configuration of the machine, the motor, and the amplifier, as illustrated in FIG. 3. The configuration of the power-consumption-amount estimation apparatus according to the present embodiment is identical to that of the first embodiment.

Figure 17:
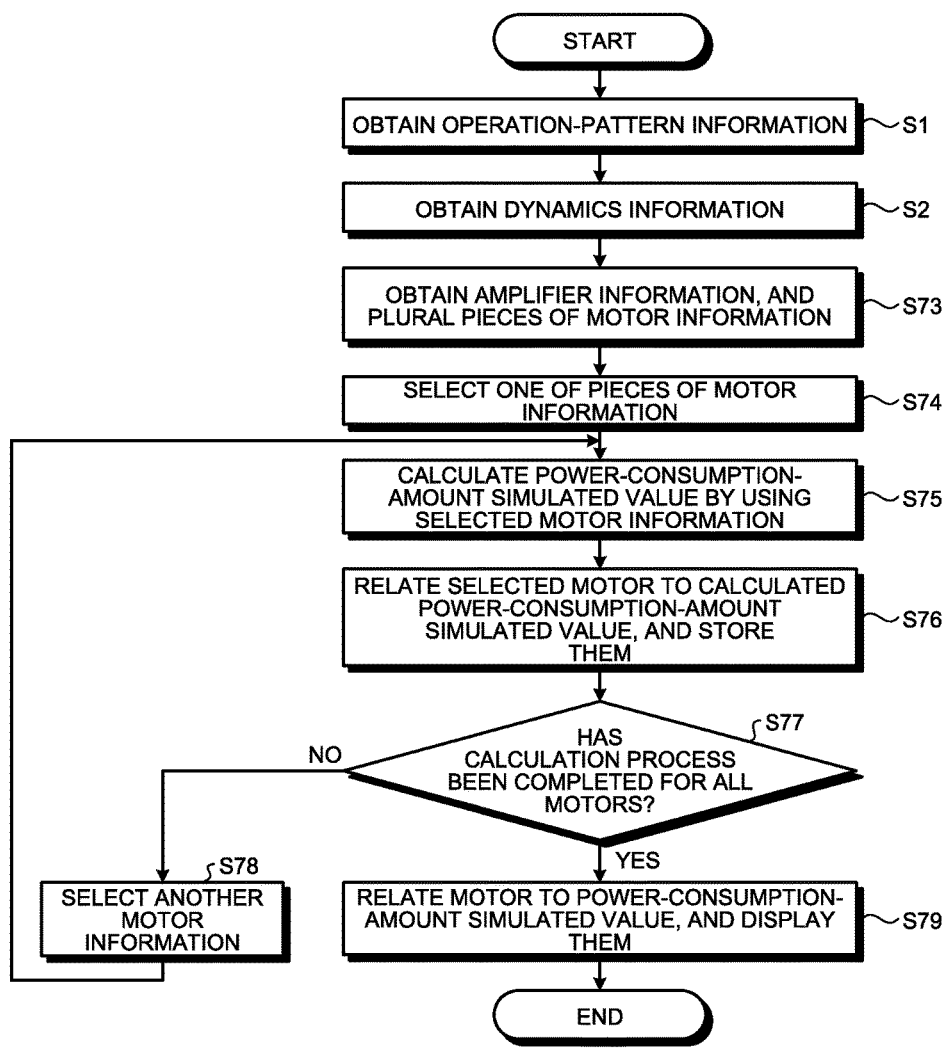
FIG. 17 is a flowchart illustrating an operation example of a power-consumption-amount estimation apparatus according to a fifth embodiment.

FIG. 17 is a flowchart illustrating an operation example of the power-consumption-amount estimation apparatus according to the fifth embodiment. In FIG. 17, the same processes as those illustrated in FIG. 4 are denoted by the same step numerals as those in FIG. 4. Descriptions of some of the processes illustrated in FIG. 17, which are denoted by the same step numerals as those in FIG. 4, are omitted.

First, the power-consumption-amount estimation apparatus obtains operation-pattern information and dynamics information from an external unit (Steps S1 and S2).

Next, the power-consumption-amount estimation apparatus obtains amplifier information and information on a plurality of motors from an external unit (Step S73). Specifically, the circuit-information obtaining unit 13 obtains and transmits the amplifier information to the power-consumption-amount calculation unit 14. Further, the circuit-information obtaining unit 13 obtains the motor information on a plurality of types of motors that are capable of driving the machine 100, and it transmits the obtained information to the power-consumption-amount calculation unit 14. In the present embodiment, the circuit-information obtaining unit 13 obtains the motor information on motors A, B, and C. These motors A, B, and C have different winding resistance values and different torque constants from each other. The circuit-information obtaining unit 13 obtains the winding resistance values and the torque constant values of the motors A, B, and C as the motor information.

Next, the power-consumption-amount estimation apparatus selects one of the pieces of motor information obtained at Step S73 (Step S74). The processes at Step S74 and at Steps S75 to S78 described later are executed by the power-consumption-amount calculation unit 14. At Step S74, the power-consumption-amount calculation unit 14 selects the motor information on the motor A, for example.

Next, the power-consumption-amount calculation unit 14 uses the motor information selected at Step S74 to calculate the power-consumption-amount simulated value when the motor that corresponds to this selected motor information is used (Step S75). The power-consumption-amount calculation unit 14 executes the same processes as Steps S4 to S12 described in the first embodiment to calculate the powerconsumption-amount simulated value. Specifically, the power-consumption-amount calculation unit 14 calculates the simulated value of the power consumption amount when the motor that corresponds to the motor information selected at Step S74 operates according to the operation pattern obtained at Step S1.

Subsequently, the power-consumption-amount calculation unit 14 relates the motor information selected at Step S74 to the power-consumption-amount simulated value calculated at Step S75 and stores them (Step S76).

Figure 18:
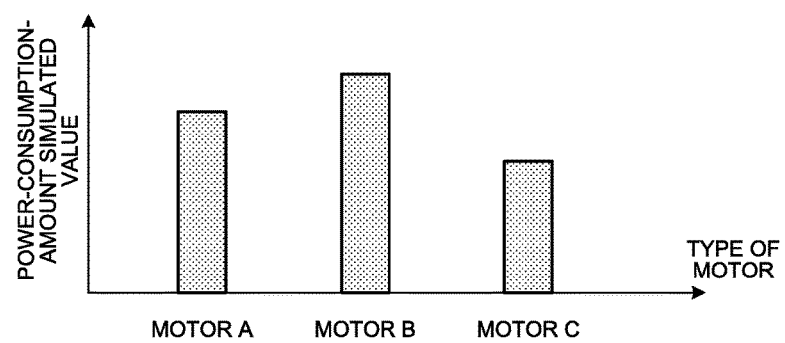
FIG. 18 is a diagram illustrating an example of an estimation result of a power consumption amount of the power-consumption-amount estimation apparatus according to the fifth embodiment.

Next, the power-consumption-amount calculation unit 14 checks whether calculation of the power-consumption-amount simulated value when each of the motors indicated by the pieces of motor information obtained at Step S73 is used has been completed (Step S77). When calculation of the simulated value has not yet been completed (NO at Step S77), the power-consumption-amount calculation unit 14 selects another motor information, i.e., one of the pieces of motor information on a motor for which calculation of the power-consumption-amount simulated value has not yet been completed (Step S78), and then it executes Steps S75 and S76 by using the selected motor information. In contrast, when calculation of the simulated values has been completed (YES at Step S77), the power-consumption-amount calculation unit 14 reads and outputs the motor information and the power-consumption-amount simulated values, which have been stored at Step S76, to the result output unit 15. The result output unit 15 then displays the power-consumption-amount simulated values when the motors, indicated by the motor information received from the power-consumption-amount calculation unit 14, are used on the display unit (Step S79). At Step S79, the result output unit 15 relates each of the motors to the power-consumption-amount simulated value, and displays the specifics, as illustrated in FIG. 18. FIG. 18 is a display example illustrating the type of motor on the horizontal axis and the power-consumption-amount simulated value when each type of motor is used on the vertical axis. In the example in FIG. 18, the power-consumption-amount simulated value is the largest when the motor B is used.

The effects obtained in the present embodiment are described here. When a user selects a motor to operate a certain machine, there may be an option to select either a motor in which the cost of the motor body is higher, while the efficiency is higher, i.e., the power consumption amount is smaller, or a motor in which the cost of the motor body is lower, while the efficiency is lower, i.e., the power consumption amount is greater. In terms of reducing the total costs, it is important to select a motor to use by taking into account the cost of the motor body and the power consumption amount that is a factor affecting the motor's running cost. The power-consumption-amount estimation apparatus according to the present embodiment can calculate a simulated value of the power consumption amount when each type of the motors that are usable in the machine is used according to a predetermined operation pattern, without actually attaching the motor to the machine and operating the motor. The power-consumption-amount estimation apparatus relates each type of the motors to a simulated value of the power consumption amount when each type of the motors is used in order to display them. This makes it possible for a user to select a motor while taking into account the total costs.

Figure 19:
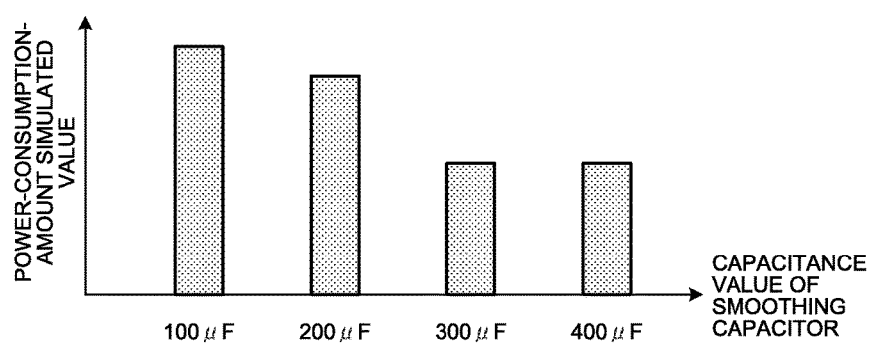
FIG. 19 is a diagram illustrating an example of an estimation result of a power consumption amount of the power-consumption-amount estimation apparatus according to the fifth embodiment.

In the present embodiment, an example has been described in which the power-consumption-amount estimation apparatus derives a simulated value of the power consumption amount from a simulation when each of a plurality of types of motors is used, and it relates the motors to the corresponding simulated values of the power consumption amount in order to display them. However, in a case where there are a plurality of types of usable amplifiers, the power-consumption-amount estimation apparatus is still capable of deriving a simulated value of the power consumption amount when each type of the usable amplifiers is used. For example, in the case where the capacitance value of the smoothing capacitor in the amplifier is changed, the power-consumption-amount estimation apparatus is capable of deriving a simulated value of the power consumption amount for each capacitance value. For example, it is also possible that the power-consumption-amount estimation apparatus calculates the power-consumption-amount simulated value for each of four types of amplifiers, in each of which the capacitance value C of the smoothing capacitor is C=100 µF, 200 µF, 300 µF, or 400 µF, when the motor and the machine are operated by using each of the amplifiers according to a predetermined operation pattern, and then displays the relation between the capacitance value of the smoothing capacitor and the power-consumption-amount simulated value when each individual smoothing capacitor is used, as illustrated in FIG. 19. FIG. 19 is a display example illustrating the capacitance value of the smoothing capacitors on the horizontal axis and the power-consumption-amount simulated value when each of the smoothing capacitors is used on the vertical axis.

Using an amplifier that includes a smoothing capacitor with a large capacitance value leads to an increase in the cost of the amplifier body. Therefore, when the power-consumption-amount estimation apparatus displays the specifics illustrated in FIG. 19, this makes it possible for a user to select an amplifier while taking into account the trade-off relation between the cost of the amplifier body and the running cost.

It is common that as the capacitance of the smoothing capacitor included in the amplifier is increased, the amount of regenerative power that can be stored in the smoothing capacitor is increased. Therefore, the power consumption amount tends to become smaller. However, the power consumption amount does not always become smaller as the capacitance of the smoothing capacitor is increased. This is because a significant amount of regenerative power may not be generated depending on the operation pattern or the configuration of the machine and the motor. In the case where a significant amount of regenerative power is not generated, when the motor is driven by an amplifier including a low-capacitance smoothing capacitor, the power consumption amount is not increased significantly.

In the example case illustrated in FIG. 19, as the capacitance value of the smoothing capacitor is increased from C=100 µF to C=200 µF and further to C=300 µF, the power-consumption-amount simulated value becomes smaller. However, although the capacitance value of the smoothing capacitor is increased from C=300 µF to C=400 µF, the power-consumption-amount simulated value does not become smaller. This indicates that the 300 µF capacitance is sufficient for the smoothing capacitor to store therein regenerative power during the motor operation. It is therefore understood that even when the capacitance value of the smoothing capacitor is set greater than 300 µF, the power consumption amount cannot be reduced. As the capacitance value of the smoothing capacitor is increased, the amplifier cost is increased. Accordingly, it is understood that, in the example in FIG. 19, even when the type of amplifier is selected to give a higher priority to a smaller power consumption amount, it is inappropriate to select an amplifier including a smoothing capacitor with a capacitance of 400 µF or greater.

As described above, the power-consumption-amount estimation apparatus calculates the power-consumption-amount simulated value when the motor and the machine are operated according to a predetermined operation pattern by using each type of the amplifiers, each of which includes a smoothing capacitor with a different capacitance value. Further, the power-consumption-amount estimation apparatus relates the capacitance value of the smoothing capacitor to the power-consumption-amount simulated value when the motor and the machine are operated by using an amplifier corresponding to the capacitance value of that smoothing capacitor, and displays them. This makes it possible for a user to easily perform the determination as described above, i.e., to easily select the capacitance of the smoothing capacitor that is a constituent of the amplifier.

Sixth Embodiment

In each of the aforementioned embodiments, a description has been given of a case where various changes are made to the type of motor or the capacitance value of the smoothing capacitor and various changes are made to the conditions in the motor information or amplifier information when each of the various types of motor is used or when each of the various capacitor values is used in order to simulate the power consumption amount corresponding to each of the various conditions. However, changing the condition variously to simulate the power consumption amount corresponding to each of the various conditions is not limited to these examples. For example, the power-consumption-amount estimation apparatus can simulate how the power consumption amount varies when the type of material of the table 104 is changed in the configuration of the machine 100 as illustrated in FIG. 3. As the type of material of the table 104 is changed, the moving inertia value J of the mechanical inertia varies. The power-consumption-amount estimation apparatus prepares in advance a plurality of moving inertia values J that vary depending on the type of material in order to simulate the power consumption amount for the individual moving inertia values J when the machine is operated according to a predetermined operation pattern. When a lightweight material is used for the table, the moving inertia value J becomes smaller and generally the power consumption amount becomes smaller. In contrast, when a heavy material is used for the table, the moving inertia value J becomes larger and the power consumption amount becomes larger. It is common that when a lightweight material is used while ensuring a certain degree of strength, this increases the machine cost. In contrast, when a heavy material is used, this reduces the machine cost. That is, there is a trade-off relation between the machine-material cost and the power consumption amount. According to the present invention, the power-consumption-amount estimation apparatus simulates the moving inertia value J that varies depending on the type of material and the power consumption amount corresponding to the moving inertia value J, and it displays the correspondence between them. Therefore, the present invention achieves the effect where a user can recognize this trade-off relation quantitatively and visually.

The example has been illustrated in which the moving inertia value J varies as the type of material of the table 104 is changed. However, it is also possible that the power-consumption-amount estimation apparatus prepares a plurality of pieces of dynamics information in advance in order to simulate the power consumption amount corresponding to each of the pieces of dynamics information. For another example, the power-consumption-amount estimation apparatus can simulate the power consumption amount when the type of ball screw 103 to be used is changed. When the type of ball screw is changed, the moving inertia value J and the friction coefficient vary. Therefore, the power-consumption-amount estimation apparatus prepares a plurality of moving inertia values or friction coefficient values according to different types of ball screw in order to simulate the power consumption amount when the machine is operated with each type of ball screw. With this operation, a user can recognize how the power consumption amount consumed by the machine varies depending on the type of ball screw that will be used.

In the present embodiment, a description has been given of a case where the simulation value of the power consumption amount when the machine is operated by a single motor and a single amplifier is calculated. However, the present embodiment is not limited to this case, and it can also be applied to a case where the machine is operated by a plurality of motors and a plurality of amplifiers or is operated by a plurality of motors and a single amplifier with a common busbar.

The configurations described in the above embodiments are only examples of the contents of the present invention, and these configurations can be combined with other publicly known techniques, and a part of the configurations can be omitted or modified without departing from the scope of the present invention.

REFERENCE SIGNS LIST

11 operation-pattern-information obtaining unit, dynamics-information obtaining unit, 13 circuit-information obtaining unit, 14 power-consumption-amount calculation unit, 15 result output unit, 31 processor, 32 memory, 33 input-output interface, 100, 300, 500 machine, 101, 301, 501 motor, 102, 302, 502 coupling, 103, 303, 503 ball screw, 104, 304, 504 table, 105, 305, 505 encoder, 106, 106a command generation unit, 107, 307, 507 current, 108, 308, 508 detection signal, 109, 309, 509 operation-pattern signal, 120 AC power supply, 121 AC voltage, 200, 200a, 400, 600 amplifier, 201 rectifier, 202 smoothing capacitor, 203 regenerative resistor, 204 regenerative transistor, 205, 255 inverter, 210 bus voltage, 211, 261 voltage command, 220, 260 servo control unit.

The invention claimed is:

1. A power-consumption-amount estimation apparatus that estimates a power consumption amount of an industrial machine including a motor, a machine that is driven by the motor, and an amplifier that drives the motor, the power-consumption-amount estimation apparatus comprising:

a processor to execute a program; and a memory to store the program which, when executed by the processor, performs an operation-pattern-information obtaining process of obtaining operation-pattern information that indicates an operation pattern of the machine or the motor;

a dynamics-information obtaining process of obtaining dynamics information that specifies dynamics of the machine and the motor;

a circuit-information obtaining process of obtaining amplifier information configured to include a resistance value of a rectifier, a capacitance of a smoothing capacitor, and a resistance value of a regenerative resistor, and motor information configured to include a winding resistance value of the motor, where the rectifier, the smoothing capacitor, and the regenerative resistor are included in the amplifier; and a power-consumption-amount calculation process of executing a process of calculating power of each of the motor and the regenerative resistor on a basis of the operation-pattern information, the dynamics information, the amplifier information, the motor information, and a bus voltage simulated value that simulates a bus voltage that is a voltage to be applied to the smoothing capacitor and of calculating power of the industrial machine on a basis of the calculated power of each of the motor and the regenerative resistor and executing a process of updating the bus voltage simulated value on a basis of the calculated power of each of the motor and the regenerative resistor and on a basis of the calculated power of the industrial machine, over a specified period of time, and estimating a power consumption amount of the industrial machine by integrating the power of the industrial machine calculated over the specified period of time.

2. The power-consumption-amount estimation apparatus according to claim 1, wherein the power-consumption-amount calculation process includes calculating power of the motor on a basis of the operation-pattern information, the dynamics information, and the motor information; calculating power of the regenerative resistor on a basis of the resistance value of the regenerative resistor, an on-voltage of a regenerative transistor connected in series to the regenerative resistor, and the bus voltage simulated value that simulates a bus voltage that is a voltage to be applied to the smoothing capacitor; further calculating power of the rectifier on a basis of the bus voltage simulated value, an output voltage of the rectifier, and the power of the regenerative resistor to set the calculated power of the rectifier as power of the industrial machine; and updating the bus voltage simulated value on a basis of the capacitance of the smoothing capacitor, the power of the motor, the power of the regenerative resistor, and the power of the rectifier.

3. The power-consumption-amount estimation apparatus according to claim 2, wherein where the bus voltage simulated value is represented as Vdc, the capacitance of the smoothing capacitor is represented as C, the power of the motor is represented as P, the power of the regenerative resistor is represented as Preg, and the power of the rectifier is represented as Pcnv, the power-consumption-amount calculation process includes updating the bus voltage simulated value Vdc as follows:

[Equation 1]

$$\frac{dVdc}{dt} = \frac{1}{C \cdot Vdc}(-P - Preg + Pcnv).$$

4. The power-consumption-amount estimation apparatus according to claim 2, wherein where the bus voltage simulated value is represented as Vdc, a cycle of updating the bus voltage simulated value is represented as Ts, the capacitance of the smoothing capacitor is represented as C, the power of the motor is represented as P, the power of the regenerative resistor is represented as Preg, and the power of the rectifier is represented as Pcnv, the power-consumption-amount calculation process updating the bus voltage simulated value Vdc as follows:

(updated $Vdc$) = $Vdc + Ts/(C \cdot Vdc) \cdot (-P - Preg + Pcnv)$.

5. The power-consumption-amount estimation apparatus according to claim 1, wherein
when the industrial machine is configured to include a plurality of sets of the motor, the machine, and the amplifier,
the operation-pattern-information obtaining process includes obtaining the operation-pattern information on the machine or the motor in each of the sets,
the dynamics-information obtaining process includes obtaining the dynamics information on the machine and the motor in each of the sets,
the circuit-information obtaining process includes obtaining the amplifier information on the amplifier and the motor information on the motor for each of the sets, and
the power-consumption-amount calculation process includes calculating power of each of the sets over a specified period of time on a basis of the operation-pattern information, the dynamics information, the amplifier information, and the motor information; calculating a power consumption amount of each of the sets by integrating the calculated power; and further calculating a power consumption amount of the industrial machine by summing the calculated power consumption amounts.

6. The power-consumption-amount estimation apparatus according to claim 5, wherein the power-consumption-amount calculation process includes calculating power of each of the motors included in the industrial machine on a basis of the operation-pattern information, the dynamics information, and the motor information; calculating power of the regenerative resistor in each of the amplifiers included in the industrial machine on a basis of a resistance value of the regenerative resistor in each of the amplifiers included in the industrial machine, an on-voltage of a regenerative transistor connected in series to the regenerative resistor, and a bus voltage simulated value that simulates a bus voltage that is a voltage to be applied to the smoothing capacitor in each of the amplifiers; further calculating power of the rectifier in each of the amplifiers included in the industrial machine on a basis of the bus voltage simulated value, an output voltage of the rectifier in each of the amplifiers, and the power of the regenerative resistor in each of the amplifiers to set the calculated power of the rectifier as the power of each of the sets; and updating the bus voltage simulated value of each of the amplifiers included in the industrial machine on a basis of a capacitance of the smoothing capacitor in each of the amplifiers, the power of each of the motors included in the industrial machine, the power of the regenerative resistor in each of the amplifiers, and the power of the rectifier in each of the amplifiers.

7. The power-consumption-amount estimation apparatus according to claim 6, wherein where the bus voltage simulated value is represented as Vdc, the capacitance of the smoothing capacitor is represented as C, the power of the motor is represented as P, the power of the regenerative resistor is represented as Preg, and the power of the rectifier is represented as Pcnv, in a set among the sets, the power-consumption-amount calculation process includes updating the bus voltage simulated value Vdc as follows:

[Equation 2]

$$\frac{dVdc}{dt} = \frac{1}{C \cdot Vdc}(-P - Preg + Pcnv).$$

8. The power-consumption-amount estimation apparatus according to claim 6, wherein where the bus voltage simulated value is represented as Vdc, a cycle of updating the bus voltage simulated value is represented as Ts, the capacitance of the smoothing capacitor is represented as C, the power of the motor is represented as P, the power of the regenerative resistor is represented as Preg, and the power of the rectifier is represented as Pcnv, in a set among the sets, the power-consumption-amount calculation process includes updating the bus voltage simulated value Vdc as follows:

(updated $Vdc$)=$Vdc+Ts/(C \cdot Vdc) \cdot (-P-Preg+Pcnv)$.

9. The power-consumption-amount estimation apparatus according to claim 1, wherein when the industrial machine is configured to include a plurality of sets of the motor and the machine and an amplifier that drives the motor in each of the sets, the operation-pattern-information obtaining process includes obtaining the operation-pattern information on the machine or the motor in each of the sets, the dynamics-information obtaining process includes obtaining the dynamics information on the machine and the motor in each of the sets, the circuit-information obtaining process includes obtaining the amplifier information on the amplifier and the motor information on the motors, and the power-consumption-amount calculation process includes calculating power of the industrial machine on a basis of the operation-pattern information on each of the sets, the dynamics information on each of the sets, the amplifier information, and the motor information.

10. The power-consumption-amount estimation apparatus according to claim 9, wherein the power-consumption-amount calculation process includes calculating power of each of the motors included in the industrial machine on a basis of the operation-pattern information, the dynamics information, and the motor information; calculating a sum value of the calculated power of the motors; calculating power of the regenerative resistor on a basis of the resistance value of the regenerative resistor, an on-voltage of a regenerative transistor connected in series to the regenerative resistor, and the bus voltage simulated value that simulates a bus voltage that is a voltage to be applied to the smoothing capacitor; further calculating power of the rectifier on a basis of the bus voltage simulated value, an output voltage of the rectifier, and the power of the regenerative resistor to set the calculated power of the rectifier as the power of the industrial machine; and updating the bus voltage simulated value on a basis of the capacitance of the smoothing capacitor, the sum value of the power of the motors, the power of the regenerative resistor, and the power of the rectifier.

11. The power-consumption-amount estimation apparatus according to claim 10, wherein where the bus voltage simulated value is represented as Vdc, the capacitance of the smoothing capacitor is represented as C, the sum value of the power of the motors is represented as P, the power of the regenerative resistor is represented as Preg, and the power of the rectifier is represented as Pcnv, the power-consumption-amount calculation process includes updating the bus voltage simulated value Vdc as follows:

[Equation 3]

$$\frac{dVdc}{dt} = \frac{1}{C \cdot Vdc}(-P - Preg + Pcnv).$$

12. The power-consumption-amount estimation apparatus according to claim 10, wherein where the bus voltage simulated value is represented as Vdc, a cycle of updating the bus voltage simulated value is represented as Ts, the capacitance of the smoothing capacitor is represented as C, the sum value of the power of the motors is represented as P, the power of the regenerative resistor is represented as Preg, and the power of the rectifier is represented as Pcnv, the power-consumption-amount calculation process updating the bus voltage simulated value Vdc as follows:

(updated $Vdc$)=$Vdc+Ts/(C \cdot Vdc) \cdot (-P-Preg+Pcnv)$.

13. The power-consumption-amount estimation apparatus according to claim 1, wherein the program which, when executed by the processor, further performs a result output process of outputting the power consumption amount calculated in the power-consumption-amount calculation process to an external unit.

14. The power-consumption-amount estimation apparatus according to claim 1, wherein the program which, when executed by the processor, further performs a result output process of outputting the power consumption amount calculated in the power-consumption-amount calculation process to an external unit, wherein the operation-pattern-information obtaining process includes obtaining a plurality of pieces of operation-pattern information, the power-consumption-amount calculation process includes executing a calculating process, on each of the pieces of operation-pattern information as a target, of selecting one of the pieces of operation-pattern information obtained in the operation-pattern-information obtaining process, of calculating, on a basis of the selected operation-pattern information, the dynamics information, the amplifier information, and the motor information, power over a specified period of time when the industrial machine operates according to the selected operation-pattern information, and of integrating the calculated power to calculate a power consumption amount of the industrial machine when the industrial machine operates according to the selected operation-pattern information, and the result output process includes relating a power consumption amount of the industrial machine when the industrial machine operates according to each of the pieces of operation-pattern information, which is obtained in the calculating process in the power-consumption-amount calculation process, to operation-pattern information used for calculating the power consumption amount and outputting the power consumption amount and the operation-pattern information to an external unit.

15. The power-consumption-amount estimation apparatus according to claim 1, wherein the program which, when executed by the processor, further performs a result output process of outputting the power consumption amount calculated in the power-consumption-amount calculation process to an external unit, wherein the circuit-information obtaining process includes obtaining a plurality of pieces of motor information, the power-consumption-amount calculation process includes executing a calculating process, on each of the pieces of motor information as a target, of selecting one of the pieces of motor information obtained in the circuit-information obtaining process, of calculating, on a basis of the selected motor information, the operation-pattern information, the dynamics information, and the amplifier information, power over a specified period of time when the industrial machine operates using a motor that corresponds to the selected motor information, and of integrating the calculated power to calculate a power consumption amount of the industrial machine when the industrial machine operates using the motor that corresponds to the selected motor information, and the result output process includes relating a power consumption amount of the industrial machine when the industrial machine operates using a motor that corresponds to each of the pieces of motor information, which is obtained in the calculating process in the power-consumption-amount calculation process, to motor information used for calculating the power consumption amount and outputting the power consumption amount and the motor information to an external unit.

16. The power-consumption-amount estimation apparatus according to claim 1, wherein the program which, when executed by the processor, further performs a result output process of outputting the power consumption amount calculated in the power-consumption-amount calculation process to an external unit, wherein the circuit-information obtaining process includes obtaining a plurality of pieces of amplifier information, the power-consumption-amount calculation process includes executing a calculating process, on each of the pieces of amplifier information as a target, of selecting one of the pieces of amplifier information obtained in the circuit-information obtaining process, of calculating, on a basis of the selected amplifier information, the operation-pattern information, the dynamics information, and the motor information, power over a specified period of time when the industrial machine operates using an amplifier that corresponds to the selected amplifier information, and of integrating the calculated power to calculate a power consumption amount of the industrial machine when the industrial machine operates using the amplifier that corresponds to the selected amplifier information, and the result output process includes relating a power consumption amount of the industrial machine when the industrial machine operates using an amplifier that corresponds to each of the pieces of amplifier information, which is obtained in the calculating process in the power-consumption-amount calculation process, to amplifier information used for calculating the power consumption amount and outputting the power consumption amount and the amplifier information to an external unit.

17. The power-consumption-amount estimation apparatus according to claim 1, wherein the program which, when executed by the processor, further performs a result output process of outputting the power consumption amount calculated in the power-consumption-amount calculation process to an external unit, wherein the dynamics-information obtaining process includes obtaining a plurality of pieces of dynamics information, the power-consumption-amount calculation process includes executing a calculating process, on each of the pieces of dynamics information as a target, of selecting one of the pieces of dynamics information obtained in the dynamics-information obtaining process, of calculating, on a basis of the selected dynamics information, the motor information, the operation-pattern information, and the amplifier information, power over a specified period of time when the industrial machine operates using a motor and a machine that correspond to the selected dynamics information, and of integrating the calculated power to calculate a power consumption amount of the industrial machine when the industrial machine operates using the motor and the machine that correspond to the selected dynamics information, and the result output process includes relating a power consumption amount of the industrial machine when the industrial machine operates using a motor and a machine that correspond to each of the pieces of dynamics information, which is obtained in the calculating process in the power-consumption-amount calculation process, to dynamics information used for calculating the power consumption amount and outputting the power consumption amount and the dynamics information to an external unit.

18. A power-consumption-amount estimation apparatus that estimates a power consumption amount of an industrial machine including a motor, a machine that is driven by the motor, and an amplifier that drives the motor and includes a smoothing capacitor and a regenerative resistor, the power-consumption-amount estimation apparatus comprising:

a processor to execute a program; and a memory to store the program which, when executed by the processor, performs a power-consumption-amount calculation process of executing a process of calculating power of the regenerative resistor on a basis of a bus voltage simulated value that simulates a bus voltage that is a voltage to be applied to the smoothing capacitor, of calculating power of the motor on a basis of operation-pattern information that indicates an operation pattern of the motor, and of calculating power of the industrial machine on a basis of the calculated power of each of the motor and the regenerative resistor and executing a process of updating the bus voltage simulated value on a basis of the calculated power of each of the motor and the regenerative resistor and on a basis of the calculated power of the industrial machine, over a specified period of time, and estimating a power consumption amount of the industrial machine by integrating the power of the industrial machine calculated over the specified period of time.

\* \* \* \* \*